United States Patent [19]
Hongo et al.

[11] Patent Number: 5,757,979
[45] Date of Patent: May 26, 1998

[54] APPARATUS AND METHOD FOR NONLINEAR NORMALIZATION OF IMAGE

[75] Inventors: Yasuo Hongo; Atsushi Yoshida, both of Tokyo, Japan

[73] Assignees: Fuji Electric Co., Ltd., Kanagawa; Fujifacom Corporation, Tokyo, both of Japan

[21] Appl. No.: 969,740

[22] Filed: Oct. 28, 1992

[30] Foreign Application Priority Data

Oct. 30, 1991 [JP] Japan .................................. 3-311664

[51] Int. Cl.$^6$ .............................. G06K 9/36; G06K 9/62
[52] U.S. Cl. .................................... 382/276; 382/185
[58] Field of Search ................................. 382/41, 44, 47, 382/9, 30, 34, 177, 185, 198, 201, 276, 277, 293; 358/451; 340/731, 741; 364/715.03, 715.04

[56] References Cited

U.S. PATENT DOCUMENTS 5,033,097  7/1991  Nakamura .......................... 382/30
5,138,668  8/1992  Abe ................................... 382/13

FOREIGN PATENT DOCUMENTS 60-251482A  12/1985  Japan .
63-313283A  12/1988  Japan .
1-116892A   5/1989   Japan .

OTHER PUBLICATIONS

H. Yamada et al., "Line Density Equalization", *The Journal of the Institute of Electronic Engineers of Japan*, vol. J67-D, No. 11, Nov. 1984, pp. 1379-1383.

H. Yamada et al., "An Improvement of Nonlinear Normalization Method", *The Report of the Institute of Electronics and Communication Engineers of Japan* D-439, 1988, pp. 1-182.

Jun Tsukumo, "Nonlinear Normalization for Handprinted Chinese Character Recognition", *Report of the Institute of Electronic, Information and Communication Engineers of Japan*, 1987, pp. 1-68.

*Primary Examiner*—Wellington Chin
*Assistant Examiner*—Jean B. Corrielus
*Attorney, Agent, or Firm*—Spencer & Frank

[57] ABSTRACT

A method for nonlinear normalization of an image, which performs pre-processing for computing the correlation between an unknown pattern and a reference pattern. A local spatial density function $\rho(X_i, Y_j)$ ($i=1-I, j=1-J$) is calculated from a two-dimensional pattern $f(X_i, Y_j)$ which is obtained by sampling the unknown pattern at a sampling interval $\gamma$. The spatial density function $\rho(X_i, Y_j)$ is obtained as the product of reciprocals of line pitches in both the X and Y directions. An x-direction cumulative function $hx(X_i)$ and a y-direction cumulative function $hy(Y_j)$ are computed by successively adding the space density function $\rho(X_i, Y_j)$. New sampling points $(X_i, Y_j)$ are computed in such a fashion that new sampling intervals ($\delta i, \epsilon j$), defined as intervals between two adjacent points of the new sampling points $(X_i, Y_j)$, satisfy the condition that a product between the cumulative function $hx(X_i)$ and $\delta i$ takes a first fixed value, and a product between the cumulative function $hy(Y_j)$ and $\epsilon j$ takes a second fixed value. The normalized sampled values at the new sampling points $(X_i, Y_j)$ are obtained by resampling the unknown pattern or by performing a computation on the two dimensional pattern $f(X_i, Y_j)$.

20 Claims, 17 Drawing Sheets

APPARATUS AND METHOD FOR NONLINEAR NORMALIZATION OF IMAGE

BACKGROUND OF THE INVENTION

1. Field of the Invention

The present invention relates to an apparatus and method for nonlinear normalization of an image, which is used for preprocessing diagrammatical patterns such as characters or symbols before recognizing them.

2. Description of the Prior Art

As a conventional technique to recognize characters and figures, a correlation method (a matching method) is well known. This method computes the correlation coefficients Rk defined by the following equation (1) between an unknown two-dimensional image P(i,j) and reference image patterns Qk(i,j), and decides the unknown pattern as the k-th reference pattern that makes the correlation coefficient Rk maximum.

$$Rk = (Qk \cdot P)/|Qk| \cdot |P| \quad (1)$$

where |P| and |Qk| are given by equations (2) and (3), and the inner product (Qk·P) is given by equation (4).

$$|P| = (\Sigma P(i,j)^2)^{1/2} \quad (2)$$

$$|Qk| = (\Sigma Qk(i,j)^2)^{1/2} \quad (3)$$

$$(Qk \cdot P) = \Sigma P(i,j) \cdot Qk(i,j) \quad (4)$$

Since the correlate method is sensitive to the displacement or size of the unknown pattern, correction of the displacement or size of the unknown pattern is usually performed before computing the correlation coefficient. This processing is called a normalization.

The normalization usually involves reduction of an image. This is because the computing amount to obtain the correlation coefficient from equation (1) increases in direct proportion to the square (N×N) of a side N of an image, and hence, when the types of symbols to be recognized are many (for example, more than 2,000 in the case of characters), the computing amount may circumvent the implementation of a practical apparatus. In a conventional apparatus, a linear normalization using the affine transformation given by equation (5) is usually carried out.

$$\begin{pmatrix} x' \\ y' \end{pmatrix} = \begin{pmatrix} a & b \\ c & d \end{pmatrix} \cdot \begin{pmatrix} x \\ y \end{pmatrix} + \begin{pmatrix} x_0 \\ y_0 \end{pmatrix} \quad (5)$$

where (x,y) is an old coordinate, (x', y') is a new coordinate, and a, b, c, d, $x_0$ and $y_0$ are fixed values.

Such a linear normalization method, however, is not sufficient for recognizing an image such as handwritten characters which may undergo irregular or partial deformation. To overcome such a disadvantage, a first conventional nonlinear normalization method for an image entitled "Line Density Equalization" is proposed on pages 1379–1383 in "The Journal of the Institute of Electronic Engineers of Japan", by Hiromitsu YAMADA, et al., November, 1984, VOL J67-D, No. 11 (REF. 1a), and Japanese patent application laying-open No. 60-251482 (1985) by Hiromitsu YAMADA, et al (REF. 1b).

The first method defines feature values called line density for sampled values, and transforms an original image in such a manner that the product of the line density and the sampling interval takes a fixed value. This transformation is a nonlinear transformation wherein portions where the line density is thick are expanded, and parts where the line density is thin are shrunk. As a result, the line pitch of the image becomes more even, improving the availability of the image space.

A second conventional method that performs nonlinear normalization on the feature values in accordance with the line density equalization is described in Japanese patent application laying-open No. 63-313283 (1988), by Hiromitsu YAMADA (REF. 2).

This method measures line densities hx(i) and hy(j) independently, and adds a fixed value α to the line densities so that the nonlinearity of the line densities is weakened (see, equation (4) of REF. 2).

A third conventional method is proposed in Japanese patent application laying-open No. 1-116892, by Hiromitsu YAMADA, et al. (REF. 3a), and a paper entitled "An Improvement of Nonlinear Normalization Method", by Hiromitsu YAMADA, et al., on page 1–182 in "The Report of The Institute of Electronics and Communication Engineers of Japan", 1988, D-439 (REF. 3b).

The third method defines a local line density $\rho(X_i, Y_j)$ as the reciprocal of a line pitch $L_x$ or $L_y$ (see, equation (6) of REF. 3a), and obtains a new sampling points $(X_i, Y_j)$ of a two-dimensional pattern based on the summations of the local line density $\rho(X_i, Y_j)$ in the X and Y directions (see, equations (7)–(12) of REF. 3a).

A fourth conventional nonlinear normalization method is proposed in "Nonlinear Normalization for Handprinted Chinese Character Recognition", by Jun TSUKUMO, on page 1–68 in the report of the Institute of Electronics, Information and Communication Engineers of Japan, 1987 (REF. 4).

The fourth method uses the reciprocal of a stroke pitch as feature amounts so that the strokes of a character is evenly allocated.

All these methods, however, may results in unnaturally transformed characters because the methods employ one-dimensional transformation performed in X and Y directions independently.

The typical example of this is illustrated in FIGS. 37A–37C: FIG. 37A illustrates input images; FIG. 37B, output images of a conventional linear normalization using a circumscribing quadrilateral; and FIG. 37C, nonlinearly normalized images using the above-mentioned "Line Density Equalization".

By comparing the input images of FIG. 37A and the nonlinearly normalized images of FIG. 37C, it is easily found that the upper portions 31 of the images of FIG. 37C are unduly shrunk in comparison with the lower portions 33. This is because the number of vertical lines in the upper portions 31 is zero, which is smaller than those in the lower portions 33, and hence, the upper portions 31 are transformed in such a fashion that they are shrunk in the vertical direction. The nonlinear transformation, however, should transform an original pattern so that the line density becomes uniform everywhere, and hence, the entire balance of an input image is maintained.

SUMMARY OF THE INVENTION

Accordingly, it is an object of the present invention to provide an apparatus and method for nonlinear normalization of an image, which eliminates the above-described disadvantage associated with the conventional techniques to provide a more natural, reliable nonlinear normalization by extracting two-dimensional, local spatial density from an irregular pattern such as handwritten characters.

It is another object of the present invention to provide an apparatus and method for nonlinear normalization of an image which can improve the recognition ratio of characters or figures by reducing noise during a feature extraction.

In a first aspect of the present invention, there is provided an apparatus for nonlinear normalization of an image, which performs pre-processing for computing the correlation between an unknown pattern and a reference pattern, the apparatus comprising:

means for obtaining a local spatial density function $\rho(X_i, Y_j)$ (i=1–I, j=1–J) from a two-dimensional pattern $f(X_i, Y_j)$ which is obtained by sampling the unknown pattern at a sampling interval $\gamma$ under the assumption that the unknown pattern is disposed in such a manner that at least four neighboring patterns in the vertical and lateral directions thereof are identical to the two-dimensional pattern, and are directed in a same direction as the two-dimensional pattern or in a line symmetric directions with regard to the two-dimensional pattern, the spatial density function $\rho(X_i, Y_j)$ being obtained as a correlate of both line pitches in the X and Y directions;

means for computing an x-direction cumulative function hx(Xi) by successively adding the space density function $\rho(X_i, Y_j)$ with varying $Y_j$ from $Y_1$ to $Y_J$ while fixing Xi;

means for computing a y-direction cumulative function hy(Yj) by successively adding the space density function $\rho(X_i, Y_j)$ with varying Xi from $X_1$ to $X_I$ while fixing $Y_j$;

means for extending the cumulative functions hx(Xi) and hy(Yj) into continuous cumulative functions hx(X) and hy(Y), respectively;

means for determining new sampling points $(X_i, Y_j)$ in such a fashion that new sampling intervals ($\delta i$, $\epsilon j$) defined as intervals between two adjacent points of the new sampling points $(X_i, Y_j)$ satisfy the condition that a product between the cumulative function hx($X_i$) and $\delta i$ takes a first fixed value, and a product between the cumulative function hy(Yj) and $\epsilon j$ takes a second fixed value; and means for computing normalized sampled values at the new sampling points $(X_i, Y_j)$ by resampling the unknown pattern or by performing a computation on the two-dimensional pattern $f(X_i, Y_j)$.

The correlate of line pitches may be a product of reciprocals of the line pitches in the X and Y directions.

The correlate of line pitches may be a sum of reciprocals of the line pitches in the X and Y directions.

The correlate of line pitches may be a reciprocal of a sum of the line pitches in the X and Y directions.

In a second aspect of the present invention, there is provided an apparatus for nonlinear normalization of an image, which performs pre-processing for computing the correlation between an unknown pattern and a reference pattern, the apparatus comprising:

means for obtaining a set of feature parameters from a twodimensional pattern $f(X_i, Y_j)$ (i=1–M, j=1–N) which is obtained by sampling the unknown pattern at a sampling interval $\gamma$;

means for computing a local spatial density function $\rho(X_i, Y_j)$ from the two-dimensional pattern f(Xi, Yj) under the assumption that v two-dimensional pattern $f(X_i, Y_j)$ is disposed in such a manner that at least four neighboring patterns in the vertical and lateral directions thereof are identical to the two-dimensional pattern, and are directed in a same direction as the two-dimensional pattern or in a line symmetric directions with regard to the two-dimensional pattern;

means for computing an x-direction cumulative function hx(Xi) by successively adding the space density function $\rho(X_i, Y_j)$ with varying $Y_j$ from $Y_1$ to $Y_J$ while fixing Xi;

means for computing a y-direction cumulative function hy(Yj) by successively adding the space density function $\rho(X_i, Y_j)$ with varying Xi from $X_1$ to $X_I$ while fixing Yj;

means for extending the cumulative functions hx($X_i$) and hy($Y_j$) into continuous cumulative functions hx(X) and hy(Y), respectively;

means for adjusting mismatch between coordinates of the set of feature parameters and coordinates of the spatial density function $\rho(X_i, Y_j)$; and means for determining new sampling points $(X_i, Y_j)$ of the set of feature parameters in such a fashion that new sampling intervals ($\delta i$, $\epsilon j$) defined as intervals between two adjacent points of the new sampling points $(X_i, Y_j)$ satisfy the condition that a product between the cumulative function hx($X_i$) and $\delta i$ takes a first fixed value, and a product between the cumulative function hy(Yj) and $\epsilon j$ takes a second fixed value.

In a third aspect of the present invention, there is provided a method for nonlinear normalization of an image, which performs pre-processing for computing the correlation between an unknown pattern and a reference pattern, the method comprising the steps of:

obtaining a local spatial density function $\rho(X_i, Y_j)$ (i=1–I, j=1–J) from a two-dimensional pattern $f(X_i, Y_j)$ which is obtained by sampling the unknown pattern at a sampling interval $\gamma$ under the assumption that the unknown pattern is disposed in such a manner that at least four neighboring patterns in the vertical and lateral directions thereof are identical to the two-dimensional pattern, and are directed in a same direction as the two-dimensional pattern or in a line symmetric directions with regard to the two-dimensional pattern, the spatial density function $\rho(X_i, Y_j)$ being obtained as a correlate of both line pitches in the X and Y directions;

computing an x-direction cumulative function hx($X_i$) by successively adding the space density function $\rho(X_i, Y_j)$ with varying $Y_j$ from $Y_1$ to $Y_J$ while fixing $X_i$;

computing a y-direction cumulative function hy($Y_j$) by successively adding the space density function $\rho(X_i, Y_j)$ with varying $X_i$ from $X_1$ to $X_I$ while fixing $Y_j$;

extending the cumulative functions hx($X_i$) and hy($Y_j$) into continuous cumulative functions hx(X) and hy(Y), respectively;

determining new sampling points $(X_i, Y_j)$ in such a fashion that new sampling intervals ($\delta i$, $\epsilon j$) defined as intervals between two adjacent points of the new sampling points $(X_i, Y_j)$ satisfy the condition that a product between the cumulative function hx($X_i$) and $\delta i$ takes a first fixed value, and a product between the cumulative function hy($Y_j$) and $\epsilon j$ takes a second fixed value; and computing normalized sampled values at the new sampling points $(X_i, Y_j)$ by resampling the unknown pattern or by performing a computation on the two-dimensional pattern $f(X_i, Y_j)$.

In a forth aspect of the present invention, there is provided a method for nonlinear normalization of an image, which performs pre-processing for computing the correlation between an unknown pattern and a reference pattern, the method comprising the steps of:

obtaining a set of feature parameters from a twodimensional pattern $f(X_i, Y_j)$ (i=1–M, j=1–N) which is obtained by sampling the unknown pattern at a sampling interval $\gamma$;

computing a local spatial density function $\rho(X_i, Y_j)$ from the two-dimensional pattern $f(X_i, Y_j)$ under the assumption that the two-dimensional pattern $f(X_i, Y_j)$ is disposed in such a manner that at least four neighboring patterns in the vertical and lateral directions thereof are identical to the two-dimensional pattern, and are directed in a same direction as the twodimensional pattern or in a line symmetric directions with regard to the two-dimensional pattern;

computing an x-direction cumulative function $hx(X_i)$ by successively adding the space density function $\rho(X_i, Y_j)$ with varying $Y_j$ from $Y_1$ to $Y_J$ while fixing $X_i$;

computing a y-direction cumulative function $hy(Y_j)$ by successively adding the space density function $\rho(X_i, Y_j)$ with varying $X_i$ from $X_1$ to $X_I$ while fixing $Y_j$;

extending the cumulative functions $hx(X_i)$ and $hy(Y_j)$ into continuous cumulative functions $hx(X)$ and $hy(Y)$, respectively;

adjusting mismatch between coordinates of the set of feature parameters and coordinates of the spatial density function $\rho(X_i, Y_j)$; and determining new sampling points $(X_i, Y_j)$ of the set of feature parameters in such a fashion that new sampling intervals $(\delta i, \epsilon j)$ defined as intervals between two adjacent points of the new sampling points $(X_i, Y_j)$ satisfy the condition that a product between the cumulative function $hx(X_i)$ and $\delta i$ takes a first fixed value, and a product between the cumulative function $hy(Y_j)$ and $\epsilon j$ takes a second fixed value.

According to the first aspect of the present invention, the two-dimensional, local spatial density function $\rho(X_i, Y_j)$ is computed from the correlate of the line pitches of both X and Y directions instead of computing it independently from the line pitches of X and Y directions. Accordingly, the present invention can achieve a more natural normalized image maintaining the entire balance of an input image.

According to the second aspect of the present invention, the feature extraction from the sampled original image is performed to obtain the feature amounts (for example, the amounts associated with the edges of a character) before or in parallel with the nonlinear transformation which is performed after the adjustment of the coordinates of the computation area of the spatial density and those of the feature amounts. This makes it possible to reduce the quantization error in the nonlinear transformation, and to realize the normalized feature image with little noise. Thus, the feature amounts can be reliably obtained.

By applying the present invention, the correlation method can be effectively employed for recognizing unknown patterns such as handwritten characters which are partly deformed. As a result, the recognition ratio of characters and figures can be improved.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

First, the principle of the present invention will be described. Let us assume that a two-dimensional pattern obtained by sampling an unknown character or figure to be recognized at a sampling interval $\gamma$ is expressed as follows:

$$f(Xi, Yj)(i=1\sim I, j=1\sim J) \quad (6)$$

where $(X_i, Y_j)$ represents a coordinate of a sampling point: $X_i$ denotes an i-th location along the X axis and $Y_j$ denotes a j-th location along the Y axis.

A continuous function $f(x,y)$ corresponding to the function $f(X_i, Y_j)$ on the continuous coordinate system is defined as follows:

$$f(x, y)=f(Xi, Yj) \quad (7)$$

$$\text{for } x: (X_i-1)X_i-\gamma x \leq X_i, X_0=0 \quad (8)$$

$$y: (Y_j-1)Y_j-\gamma y \leq Y_j, Y_0=0 \quad (9)$$

The function $f(x,y)$ is considered to represent values at points other than the sampling points of the character or figure to be sampled.

A first embodiment of the present invention will be described based on these assumptions.

EMBODIMENT 1

Figure 2:
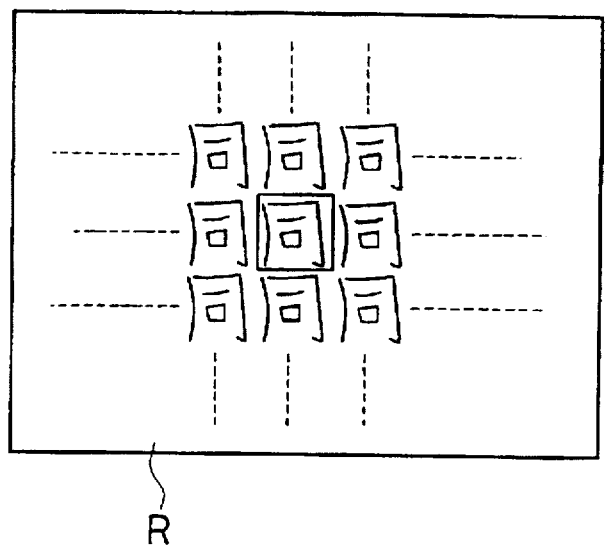
FIG. 2 is a schematic diagram showing the allocation of sampled two-dimensional patterns.

First, it is assumed in this embodiment that a character which can be represented by a function $f(x,y)$ is surrounded by repetitions of this character which are oriented in the same direction and which are arrayed in both the X and Y directions on an infinite plane R, as schematically illustrated in FIG. 2.

Figure 3:
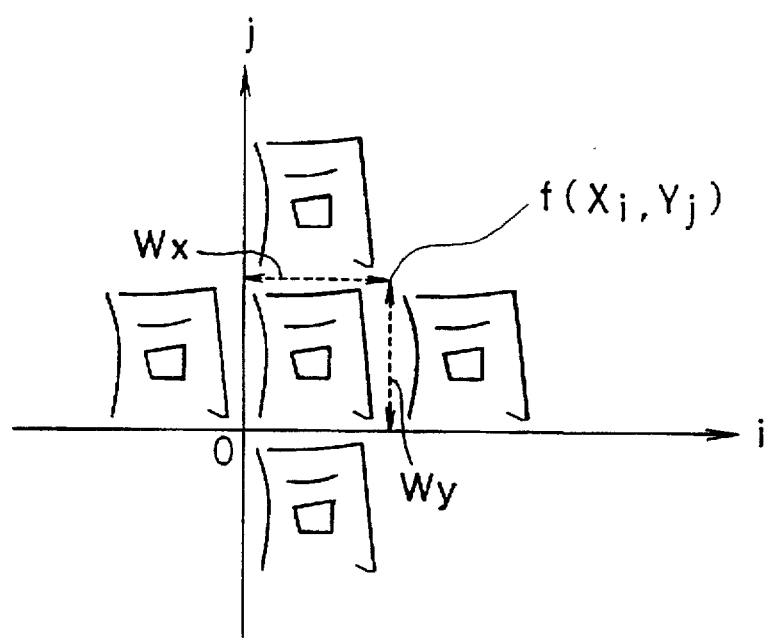
FIG. 3 is an enlarged schematic diagram of FIG. 1.

This assumption is necessary because of the following reason. If a first character has no adjacent character in its right-hand side, for example, the line pitch of the right-most portions of the first character cannot be defined. To define the line pitch of each stroke of the character, at least four adjacent characters surrounding the first character as shown in FIG. 3 are needed.

The spatial density $\rho(X_i, Y_j)$ at the point $(X_i, Y_j)$ on the plane R is computed by the following processings.

Figure 4:
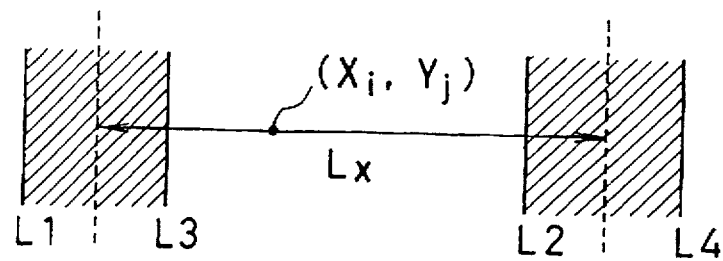
FIGS. 4–6 are diagrams illustrating the definitions of a line pitch.
Figure 5:
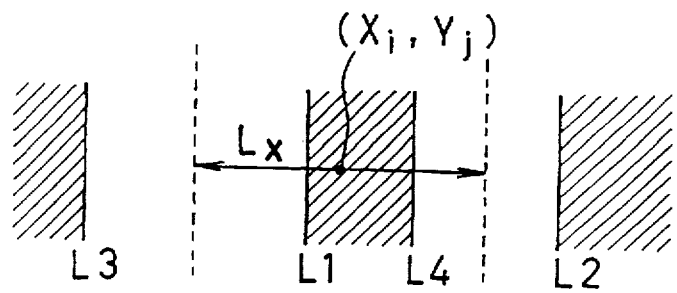

First, locations L1 and L2 of rising edges and locations L3 and L4 of falling edges in the X direction are detected as shown in FIGS. 4 and 5. Here, the rising edge is the point at which an image changes from white (0) to black (1), whereas the falling edge is the point at which the image changes from black (1) to white (0). The locations L1 and L3 are placed at the left-hand side of the point $(X_i, Y_j)$, whereas the locations L2 and L4 are placed at the right-hand side thereof. The locations L1–L4 are expressed by the following equations (10)–(13), where ^f represents the negation of f.

$$L1=\max\{i'|i'<i, \hat{f}(i', j)\cdot f(i'+1, j)=1\} \quad (10)$$

$$L2=\min\{i'|i'\geq i, \hat{f}(i', j)\cdot f(i'+1, j)=1\} \quad (11)$$

$$L3=\max\{i'|i'<i, f(i', j)\cdot \hat{f}(i'+1, j)=1\} \quad (12)$$

$$L4=\min\{i'|i'\geq i, f(i', j)\cdot \hat{f}(i'+1, j)=1\} \quad (13)$$

Subsequently, the line pitch $L_x$ in the X direction is calculated from the locations L1–L4 using equation (14) when the locations L1–L4 are determinate, or equation (15) when they are indeterminate.

$$L_x=(L2-L1+L4-L3)/2 \text{ (for determinate } L1-L4) \quad (14)$$

$$L_x=4W_x \text{ (for indeterminate } L1-L4) \quad (15)$$

where $W_x$ is the width of the input image as shown in FIG. 3.

Figure 6:
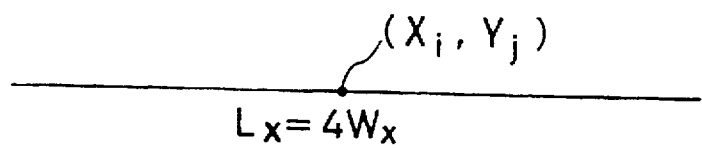

FIGS. 4–6 illustrate the line pitch $L_x$. In these figures, the closed circles represent the coordinates $(X_i, Y_j)$ of interest, the shadowed portions are black (1), the other portions are white (0), and the broken lines indicate the centers of the black and white regions. Equations (14) and (15) correspond to FIGS. 4, 5 and 6, respectively. Although the line pitch $L_x$ is indeterminate where the lines of a character is absent, it is experimentally determined at $4W_x$ as in equation (15) and FIG. 6 so that it takes a rather large value compared with the line pitches $L_x$ in the portions where lines of a character are present.

The line pitch $L_y$ in the Y direction can also be obtained in a similar manner.

Next, the spatial density $\rho(Xi, Yj)$ is obtained as the product of the reciprocals of the line pitches $L_x$ and $L_y$. More specifically, the spatial density $\rho(X_i, Y_j)$ is given by the following equation (16):

$$\rho(Xi, Yj)=(W_y/L_x)(W_x/L_y) \quad (16)$$

where $W_y$ is the height of the input image as shown in FIG. 3. The spatial density $\rho(X_i, Y_j)$ thus defined is a featuring aspect of the present invention because the conventional techniques described above define the spatial density in the X and/or Y directions independently. On the other hand, in the present invention, the spatial density $\rho(X_i, Y_j)$ is defined as a two-variable function of both line pitches $L_x$ and $L_y$.

Next, the projective functions $hx(X_i)$ and $hy(Y_j)$ of the spatial density $\rho(X_i, Y_j)$ to the X and Y directions are obtained by the following equations (17) and (18).

$$hx(Xi) = \sum_{j=1}^{J} \rho(Xi, Yj) \quad (17)$$

$$hy(Yj) = \sum_{i=1}^{I} \rho(Xi, Yj) \quad (18)$$

The functions $hx(X_i)$ and $hy(Y_j)$ are assumed to take the forms of equations (19) and (20) on the continuous coordinate system like equation (7).

$$h_x(X)=h_x(X_i), \text{ for } X_i-\gamma<X\leq X_i \quad (19)$$

$$h_y(Y)=h_y(Y_j), \text{ for } Y_j-\gamma<Y\leq Y_j \quad (20)$$

Then, the total sums $C_x$ and $C_y$ of the projective functions are calculated in accordance with equations (21) and (22).

$$Cx = \sum_{i=1}^{I} hx(Xi) \quad (21)$$

$$Cy = \sum_{j=1}^{J} hy(Yj) \quad (22)$$

Subsequently, a normalized figure expressed as $g(X_i, Y_j)$ (where i=1–I, j=1–J) in accordance with the present invention can be obtained as follows: First, the new i-th sampling point $X_i$ along the X axis is determined such that the product between the sampling interval $\delta(i)$ and the value $hx(X_i)$ at that point takes a fix value as expressed by the following equation:

$\delta(i) \cdot h_x(X'_i) = \gamma \cdot C_x/I = \text{a fixed value}$ (23)

$X'_i - \delta(i) = X'_{i-1}$ (24)

Similar relationships also apply to the Y direction as follows:

$\epsilon(j) \cdot h_y(Y'_j) = \gamma \cdot C_y/J = \text{a fixed value}$ (25)

$Y'_j - \epsilon(j) = Y'_{j-1}$ (26)

Here, the fixed values in equations (23) and (25) are determined as $\gamma C_x/I$ and $\gamma C_y/J$ so that the total number of sampling points of the normalized figure also becomes I×J.

These are the principle of the present invention. Next, the method of resampling using the new sampling points expressed by equations (23)–(26) will be described.

Figure 7:
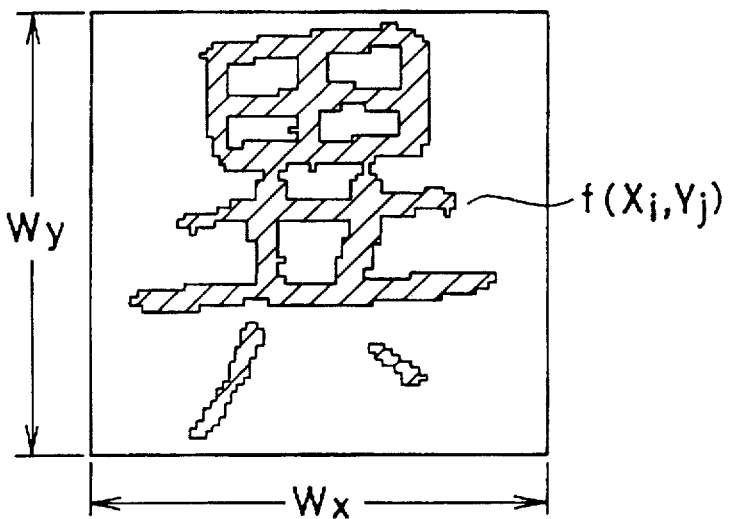
FIG. 7 is a diagram illustrating an input image to be processed by the first embodiment.
Figure 8:
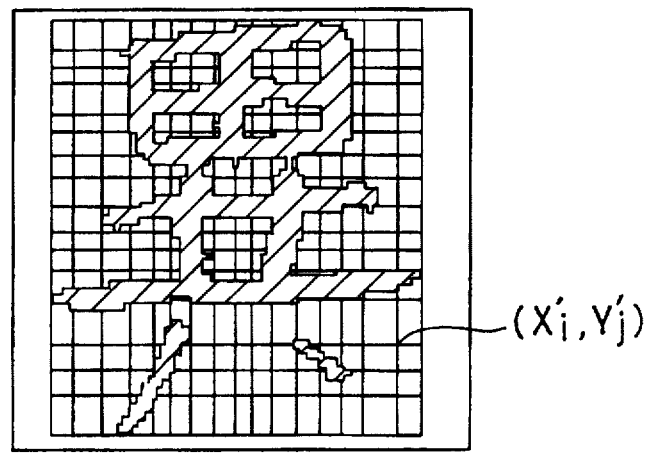
FIG. 8 is a diagram illustrating new sampling points in accordance with the first embodiment.
Figure 9:
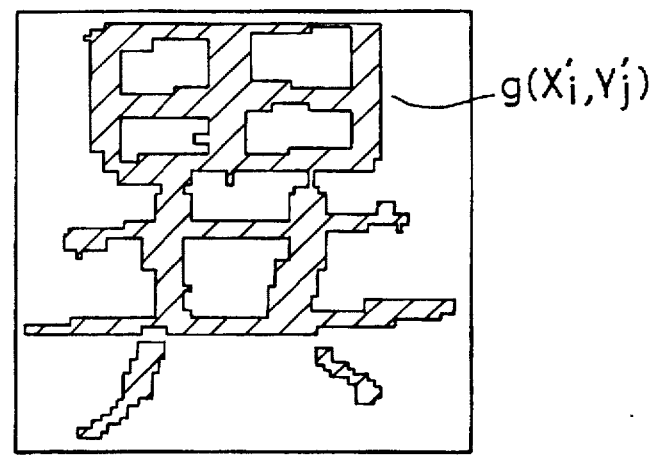
FIG. 9 is a diagram illustrating a normalized image in accordance with the first embodiment.

FIGS. 7–9 illustrate the process of the normalization as described above: FIG. 7 illustrates an input image; FIG. 8, locations of the new sampling (resampling) points; and FIG. 9, the normalized image.

To implement the resampling whose sampling points are represented by equations (23)–(26), the cumulative functions of the spatial densities are defined as the following equations (27) and (28).

$$Dx(x) = \int_0^x hx(u)/\gamma \, du \quad (27)$$

$$Dy(y) = \int_0^y hy(v)/\gamma \, dv \quad (28)$$

where hx and hy are the functions on the continuous coordinate system defined by equations (19) and (20).

According to these definitions, the sampling points $(X_i, Y_j)$ of the normalized sampled figure $g(X_i, Y_j)$ can be calculated by the following equations (29) and (30).

$X'i = \{x | Dx(x) = i \cdot Cx/I\}$ (29)

$Y'j = \{y | Dy(y) = j \cdot Cy/J\}$ (30)

Here, $C_x/I$ and $C_y/J$ are obtained by equally dividing the sum totals $C_x$ and $C_y$ of the projective functions by the number of sampling points I and J in the X and Y directions. In other words, the new sampling points are determined such that the cumulative functions Dx and Dy take the i-th and j-th values i×$C_x/I$ and j×$C_y/J$ in the series of equally divided parts of the sum totals at the sampling points $(X_i, Y_j)$.

Figure 1:
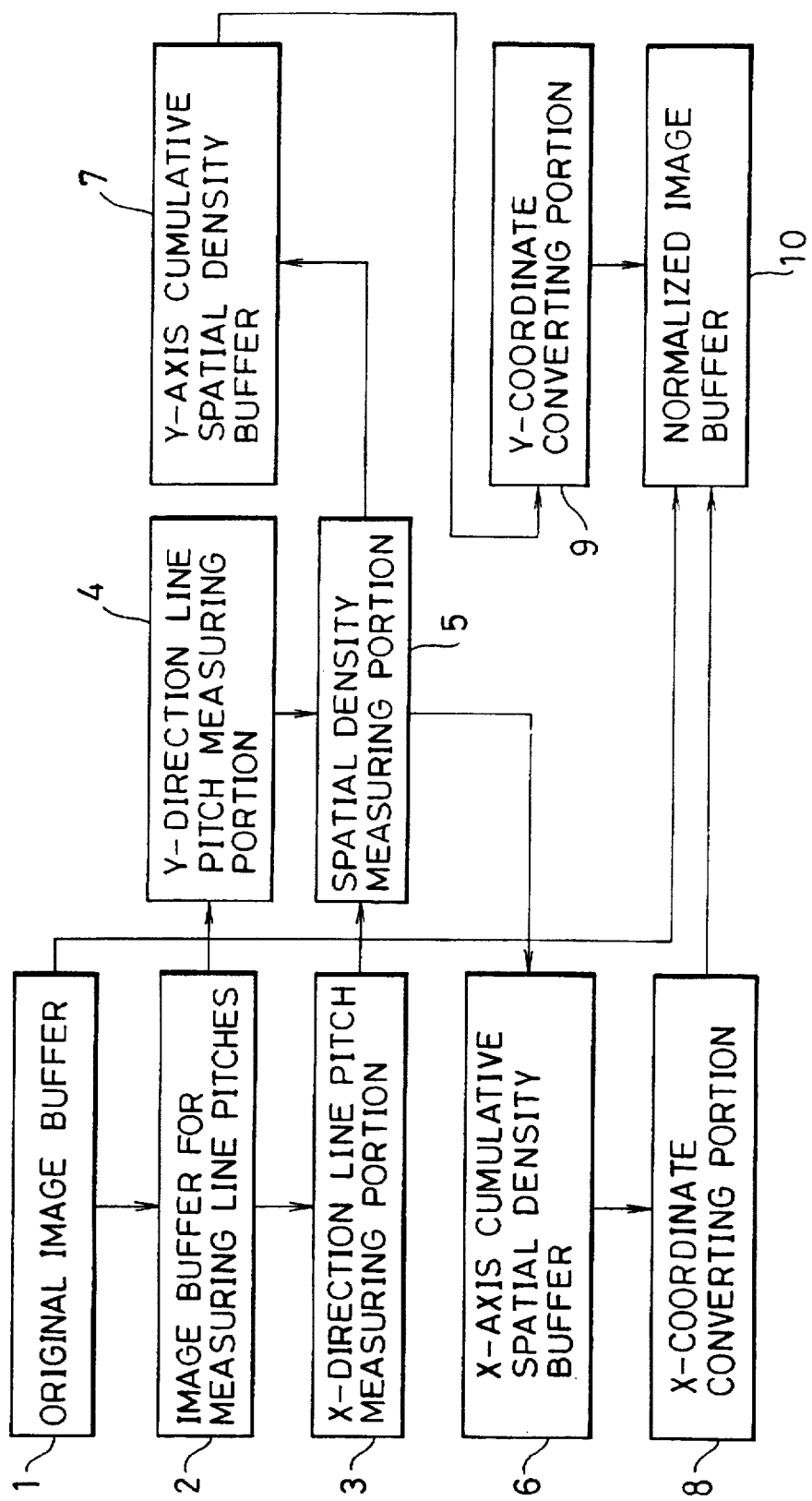
FIG. 1 is a block diagram showing the arrangement of first to sixth embodiments of an apparatus for nonlinear normalization of an image in accordance with the present invention.

FIG. 1 is a functional block diagram illustrating the arrangement of a normalizing apparatus in accordance with the present invention.

In FIG. 1, an original image like a character or figure to be normalized is inputted to an original image buffer 1. The original image data is supplied to an image buffer 2 for measuring line pitches, and then to an X-direction line pitch measuring portion 3 and a Y-direction line pitch measuring portion 4. The X-direction line pitch measuring portion 3 calculates the line pitch $L_x$ in the X direction by using equations (14) and (15), and the Y-direction line pitch measuring portion 4 calculates the line pitch $L_y$ in the Y direction by using similar equations. The results of the calculations are supplied to a spatial density measuring portion 5 which computes the spatial density $\rho(X_i, Y_j)$ by using equation (16). The spatial density $\rho(X_i, Y_j)$ is supplied to an X-axis cumulative spatial density buffer 6 and a Y-axis cumulative spatial density buffer 7, which carry out the operations given by equations (17) and (21), and (18) and (22), respectively. The output of the Xaxis cumulative spatial density buffer 6 is applied to an Xcoordinate converting portion 8 which performs the operations given by equations (23), (24), (27) and (29) to obtain the new sampling points $X_i$ in the X direction of the figure to be normalized. Similarly, the output of the Y-axis cumulative spatial density buffer 7 is applied to a Y-coordinate converting portion 9 which performs the operations given by equations (25), (26), (28) and (30) to obtain the new sampling points $Y_j$ in the Y direction of the figure to be normalized. The new sampling points $(X_i, Y_j)$ of the normalized figure $g(X_i, Y_j)$ are stored in a normalized image buffer 10. The configuration of FIG. 1 is shared from the first to six embodiments of the present invention. Only the operation of the spatial density measuring portion 5 is different.

EMBODIMENT 2

In this embodiment, it is assumed, as in the first embodiment, that an infinite number of two-dimensional patterns $f(X_i, Y_j)$ (i=1–I, j=1–J) which are formed by sampling an original image at the sampling interval $\gamma$ are oriented in the same direction and are arrayed in both the X and Y directions on an infinite plane R. The spatial density $\rho(X_i, Y_j)$ at a point $(X_i, Y_j)$ is obtained on this plane by the following process.

First, the line pitches $L_x$ and $L_y$ in the X and Y directions are obtained by using equations (14) and (15), and similar equations.

Subsequently, the spatial density $\rho(X_i, Y_j)$ is calculated as the sum of reciprocals of the line pitches $L_x$ and $L_y$ in accordance with equation (31).

$\rho(Xi, Yj) = (W_x/L_x) + (W_y/L_y)$ (31)

Then, as in the first embodiment, the projective functions $hx(X_i)$ and $hy(Y_j)$ of the spatial density $\rho(X_i, Y_j)$ to the X and Y directions are obtained using equations (17) and (18), followed by the calculation of the total sums $C_x$ and $C_y$ of the projective functions using equations (21) and (22). Finally, the locations of the new sampling points $(X_i, Y_j)$ are computed using equations (27)–(30).

Figure 10:
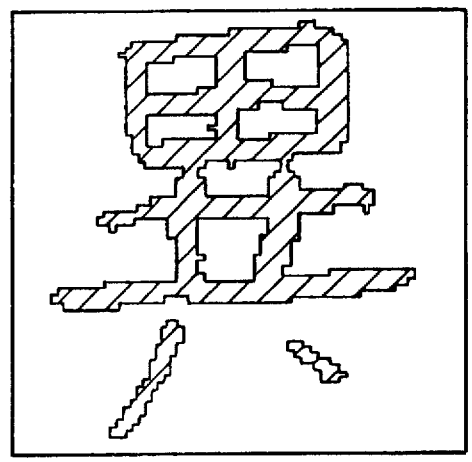
FIG. 10 is a diagram illustrating an input image to be processed by the second embodiment.
Figure 11:
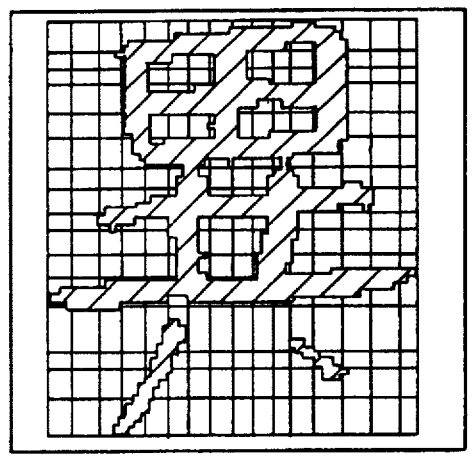
FIG. 11 is a diagram illustrating new sampling points in accordance with the second embodiment.
Figure 12:
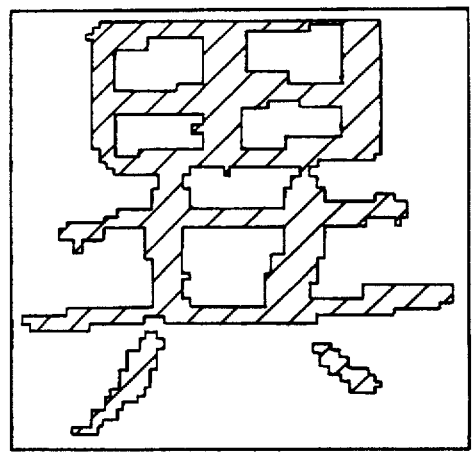
FIG. 12 is a diagram illustrating a normalized image in accordance with the second embodiment.

FIGS. 10–12 illustrate the process of the normalization described above: FIG. 10 illustrates an input image; FIG. 11, locations of the new sampling points $(X_i, Y_j)$; and FIG. 12, the normalized image using the new sampling points.

EMBODIMENT 3

In this embodiment, it is assumed, as in the first embodiment, that the infinite number of two-dimensional patterns $f(X_i, Y_j)$ (i=1–I, j=1–J) which are formed by sampling an original image at the sampling interval $\gamma$ are oriented in the same direction and are arrayed in both the X and Y directions on an infinite plane R. The spatial density $\rho(X_i, Y_j)$ at a point $(X_i, Y_j)$ is obtained on this plane by the following process.

First, the line pitches $L_x$ and $L_y$ in the X and Y directions are obtained by using equations (14) and (15) and similar equations.

Subsequently, the spatial density $\rho(X_i, Y_j)$ is calculated as the reciprocal of the sum of the line pitches $L_x$ and $L_y$ in accordance with equation (32).

$\rho(Xi, Yj) = 1/\{(L_x/W_x) + (L_y/W_y)\}$ (32)

Then, as in the first embodiment, the projective functions $hx(X_i)$ and $hy(Y_j)$ of the spatial density $\rho(X_i, Y_j)$ to the X and Y directions are obtained using equations (17) and (18), followed by the calculation of the total sums $C_x$ and $C_y$ of the projective functions using equations (21) and (22). Finally, the locations of the new sampling points $(X_i, Y_j)$ are computed using equations (27)–(30).

Figure 13:
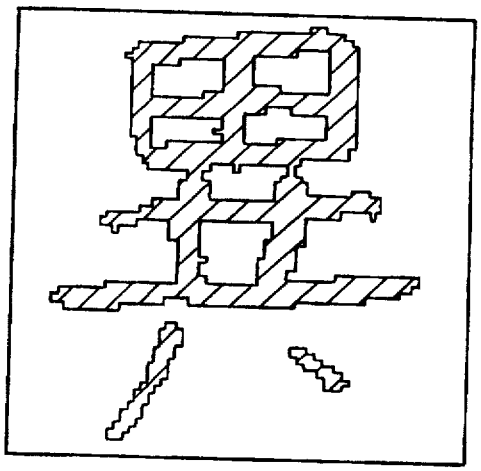
FIG. 13 is a diagram illustrating an input image to be processed by the third embodiment.
Figure 14:
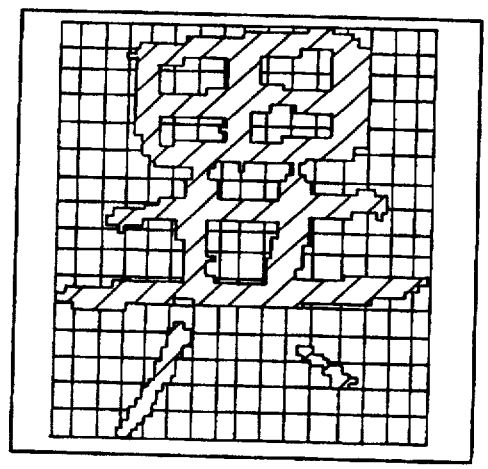
FIG. 14 is a diagram illustrating new sampling points in accordance with the third embodiment.
Figure 15:
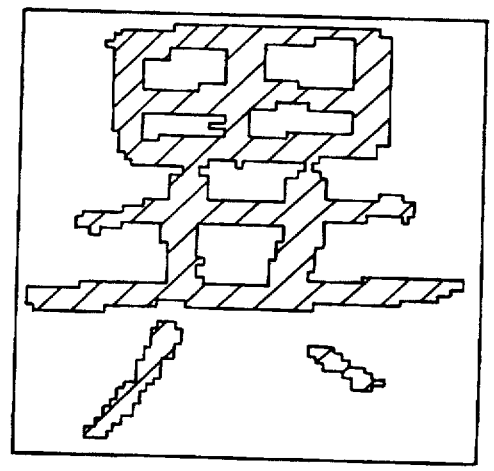
FIG. 15 is a diagram illustrating a normalized image in accordance with the third embodiment.

FIGS. 13–15 illustrate the process of the normalization described above: FIG. 13 illustrates an input image; FIG. 14, locations of the new sampling points $(X_i, Y_j)$; and FIG. 15, the normalized image by using the new sampling points.

EMBODIMENT 4

Figure 16:
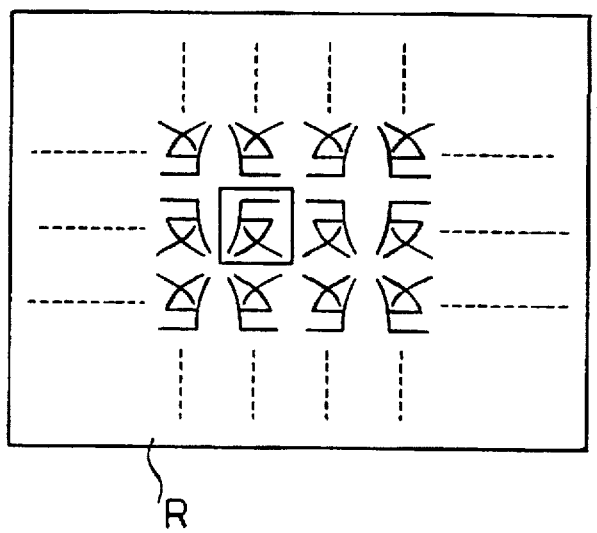
FIG. 16 is a schematic diagram showing the allocation of sampled two-dimensional patterns.
Figure 17:
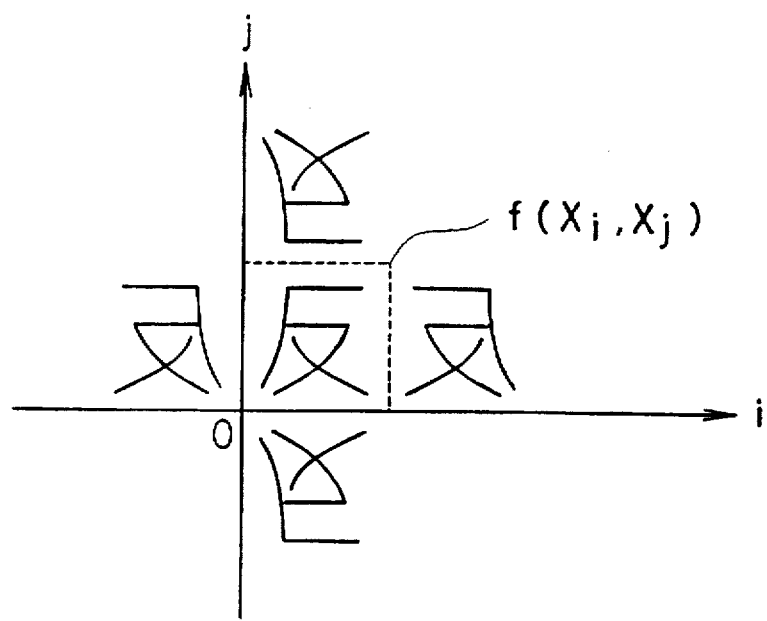
FIG. 17 is an enlarged schematic diagram of FIG. 16.

In this embodiment, it is assumed, that the infinite number of two-dimensional patterns $f(X_i, Y_j)$ (i=1–I, j=1–J) which are formed by sampling an original image at the sampling interval γ are arrayed in both X and Y directions on a plane at infinity R in such a fashion that the four neighboring patterns in the vertical and lateral directions of any pattern are disposed line symmetrically as shown in FIGS. 16 and 17. The spatial density $\rho(X_i, Y_j)$ at a point $(X_i, Y_j)$ is obtained on this plane R by the following process.

First, the line pitches $L_x$ and $L_y$ in the X and Y directions are obtained by using equations (14) and (15) and similar equations.

Subsequently, the spatial density $\rho(X_i, Y_j)$ is calculated as the product of reciprocals of the line pitches $L_x$ and $L_y$ in the X and Y directions in accordance with equation (16).

Then, as in the preceding embodiments, the projective functions $hx(X_i)$ and $hy(Y_j)$ of the spatial density $\rho(X_i, Y_j)$ to the X and Y directions are obtained using equations (17) and (18), followed by the calculation of the total sums $C_x$ and $C_y$ of the projective functions using equations (21) and (22). Finally, the locations of the new sampling points $(X_i, Y_j)$ are computed using equations (27)–(30).

Figure 18:
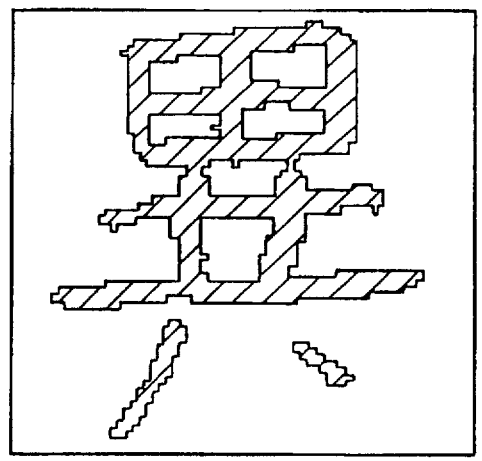
FIG. 18 is a diagram illustrating an input image to be processed by the fourth embodiment.
Figure 19:
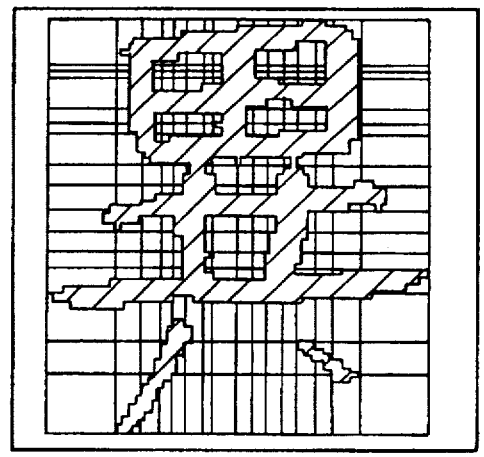
FIG. 19 is a diagram illustrating new sampling points in accordance with the fourth embodiment.
Figure 20:
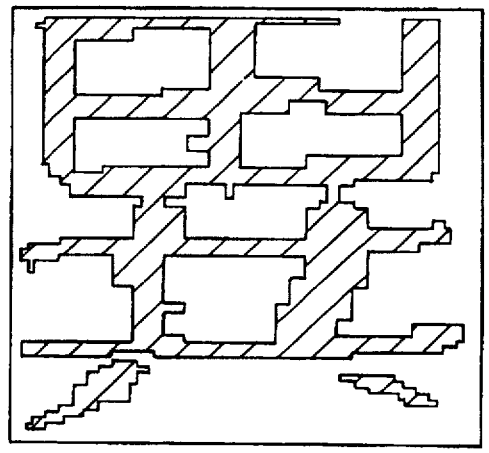
FIG. 20 is a diagram illustrating a normalized image in accordance with the fourth embodiment.

FIGS. 18–20 illustrate the process of the normalization described above: FIG. 18 illustrates an input image; FIG. 19, locations of the new sampling points $(X_i, Y_j)$; and FIG. 20, the normalized image using the new sampling points.

EMBODIMENT 5

In this embodiment, it is assumed, as in the fourth embodiment, that the infinite number of two-dimensional patterns $f(X_i, Y_j)$ (i=1–I, j=1–J) which are formed by sampling an original image at the sampling interval γ are arrayed in both X and Y directions on a plane at infinity R in such a fashion that the four neighboring patterns in the vertical and lateral directions of any pattern are disposed line symmetrically. The spatial density $\rho(X_i, Y_j)$ at a point $(X_i, Y_j)$ is obtained on this plane R by the following process.

First, the line pitches $L_x$ and $L_y$ at the points $(X_i, Y_j)$ in the X and Y directions are obtained by using equations (14) and (15) and similar equations.

Subsequently, the spatial density $\rho(X_i, Y_j)$ is calculated as the sum of reciprocals of the line pitches $L_x$ and $L_y$ using equation (31).

Then, as in the preceding embodiments, the projective functions $hx(X_i)$ and $hy(Y_j)$ of the spatial density $\rho(X_i, Y_j)$ to the X and Y directions are obtained using equations (17) and (18), followed by the calculation of the total sums $C_x$ and $C_y$ of the projective functions using equations (21) and (22). Finally, the locations of the new sampling points $(X_i, Y_j)$ are computed using equations (27)–(30).

Figure 21:
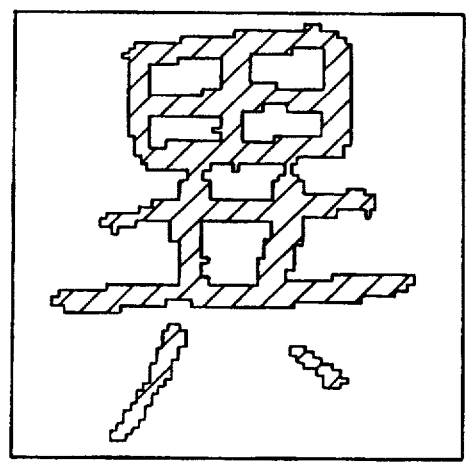
FIG. 21 is a diagram illustrating an input image to be processed by the fifth embodiment.
Figure 22:
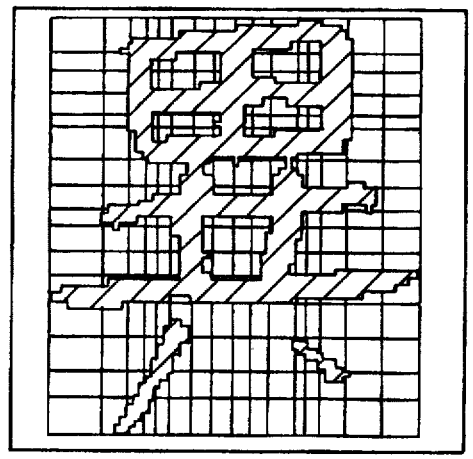
FIG. 22 is a diagram illustrating new sampling points in accordance with the fifth embodiment.
Figure 23:
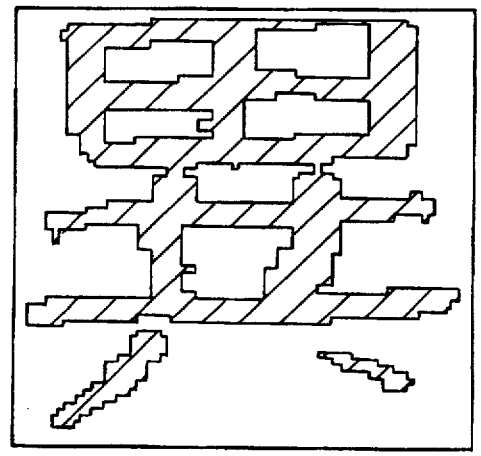
FIG. 23 is a diagram illustrating a normalized image in accordance with the fifth embodiment.

FIGS. 21–23 illustrate the process of the normalization described above: FIG. 21 illustrates an input image; FIG. 22, locations of the new sampling points $(X_i, Y_j)$; and FIG. 23, the normalized image using the new sampling points.

EMBODIMENT 6

In this embodiment, it is assumed, as in the fourth embodiment, that the infinite number of two-dimensional patterns $f(X_i, Y_j)$ (i=1–I, j=1–J) which are formed by sampling an original image at the sampling interval γ are arrayed in both X and Y directions on a plane at infinity R in such a fashion that the four neighboring patterns in the vertical and lateral directions of any pattern are disposed line symmetrically. The spatial density $\rho(X_i, Y_j)$ at a point $(X_i, Y_j)$ is obtained on this plane R by the following process.

First, the line pitches $L_x$ and $L_y$ at the points $(X_i, Y_j)$ in the X and Y directions are obtained by using equations (14) and (15) and similar equations.

Subsequently, the spatial density $\rho(X_i, Y_j)$ is calculated as the reciprocal of the sum of the line pitches $L_x$ and $L_y$ using equation (32).

Then, as in the preceding embodiments, the projective functions $hx(X_i)$ and $hy(Y_j)$ of the spatial density $\rho(X_i, Y_j)$ to the X and Y directions are obtained using equations (17) and (18), followed by the calculation of the total sums $C_x$ and $C_y$ of the projective functions using equations (21) and (22). Finally, the locations of the new sampling points $(X_i, Y_j)$ are computed using equations (27)–(30).

Figure 24:
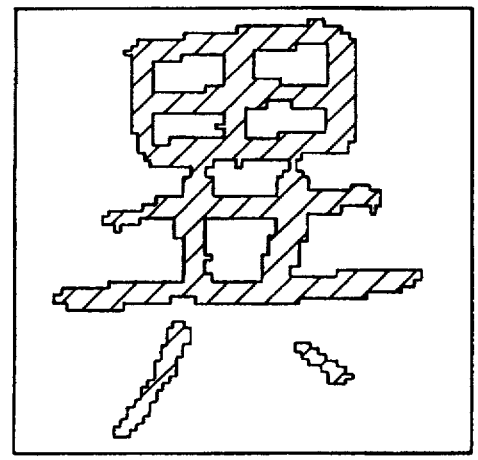
FIG. 24 is a diagram illustrating an input image to be processed by the sixth embodiment.
Figure 25:
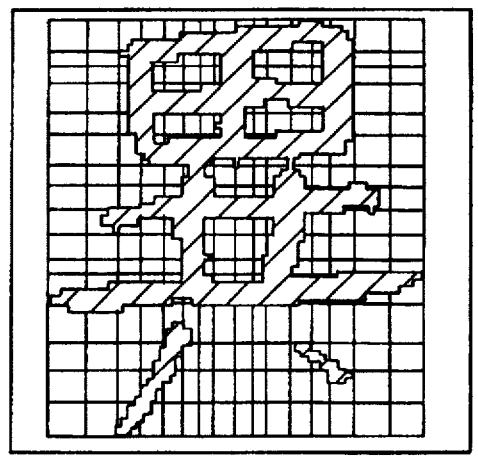
FIG. 25 is a diagram illustrating new sampling points in accordance with the sixth embodiment.
Figure 26:
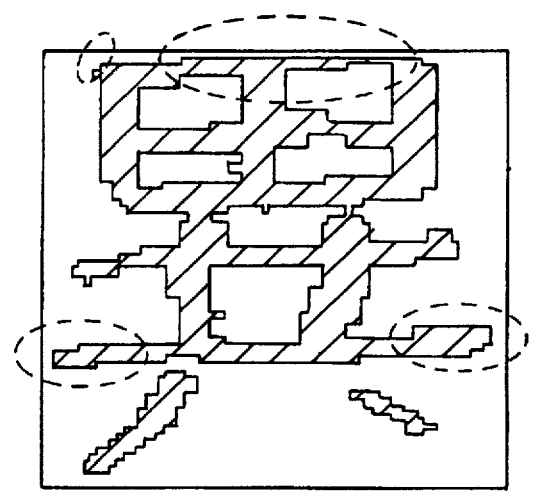
FIG. 26 is a diagram illustrating a normalized image in accordance with the sixth embodiment.

FIGS. 24–26 illustrate the process of the normalization described above: FIG. 24 illustrates an input image; FIG. 25, locations of the new sampling points $(X_i, Y_j)$; and FIG. 26, the normalized image using the new sampling points.

In accordance with the first to sixth embodiments, the nonlinear normalization of an input image can be performed in a stable manner without losing the balance of an input image.

These embodiments, however, have a disadvantage as described below, because the feature extraction is carried out after the image has been subjected to the nonlinear normalization.

Figure 27:
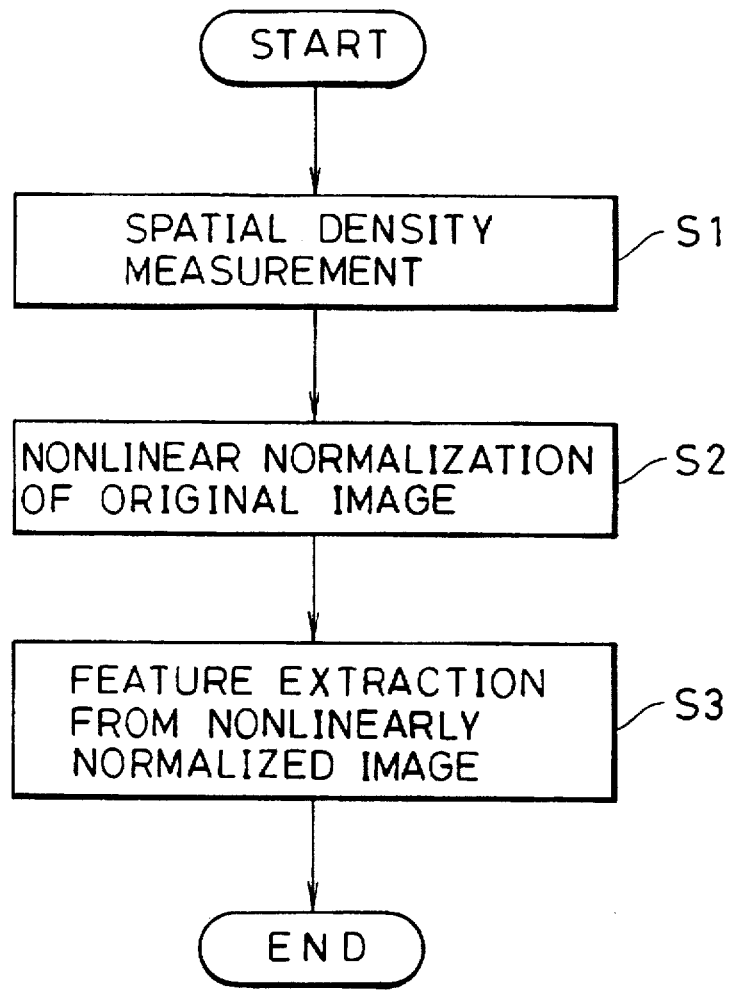
FIG. 27 is a flowchart showing the normalization processing and feature extraction processing of an image using the first to sixth embodiments.

The feature extraction processing forms a feature image by processing a sampled original image $f(X_i, Y_j)$ using a 3×3 mask operation. The mask operation may employs a 3×3 Xdirection edge detection mask and a 3×3 Y-direction edge detection mask, for example. The X-direction edge detection mask consists of three columns: the left column consists of three pixels, each of which takes a value −1; the middle column consists of three pixels, each of which takes a value 0; and the right columns consists of three pixels, each of which takes a value 1. Likewise, the Y-direction edge detection mask consists of three rows: the top row consists of three pixels, each of which takes a value −1; the middle row consists of three pixels, each of which takes a value 0; and the bottom row consists of three pixels, each of which takes a value 1. Using these masks, a feature vector (Vx, Vy) is obtained for each pixel where $-3 \leq Vx \leq 3$, and $-3 \leq Vy \leq 3$. Each feature vector (Vx, Vy) is resolved into eight directions separated 45 degrees apart, and is matched with the feature vectors of the reference patterns for each of the eight directions, thereby calculating the correlation coefficients. FIG. 27 shows a method which performs an image processing by combining the nonlinear normalization of an image in accordance with the present invention (at steps S1 and S2) and the feature extraction processing described-above (step S3).

This method which performs feature extraction after the normalization of the image, however, presents a new problem as follows:

The image which has been subjected to the nonlinear conversion using the spatial density may result in a locally rough image as indicated by broken circles in FIG. 26 because line dense portions in an original image as shown in FIG. 24 are sampled and copied many times, whereas line thin portions are omitted. This will cause the noise in the feature extraction. In particular, since the local operation using the 3×3 mask is preferably employed in an image processing because of the trade off between the operation amount and the mask size, the rough local features may present a great problem.

Therefore, seventh to twelfth embodiments are proposed to reduce the local noise and to improve the recognition ratio of a character or figure.

Figure 28:
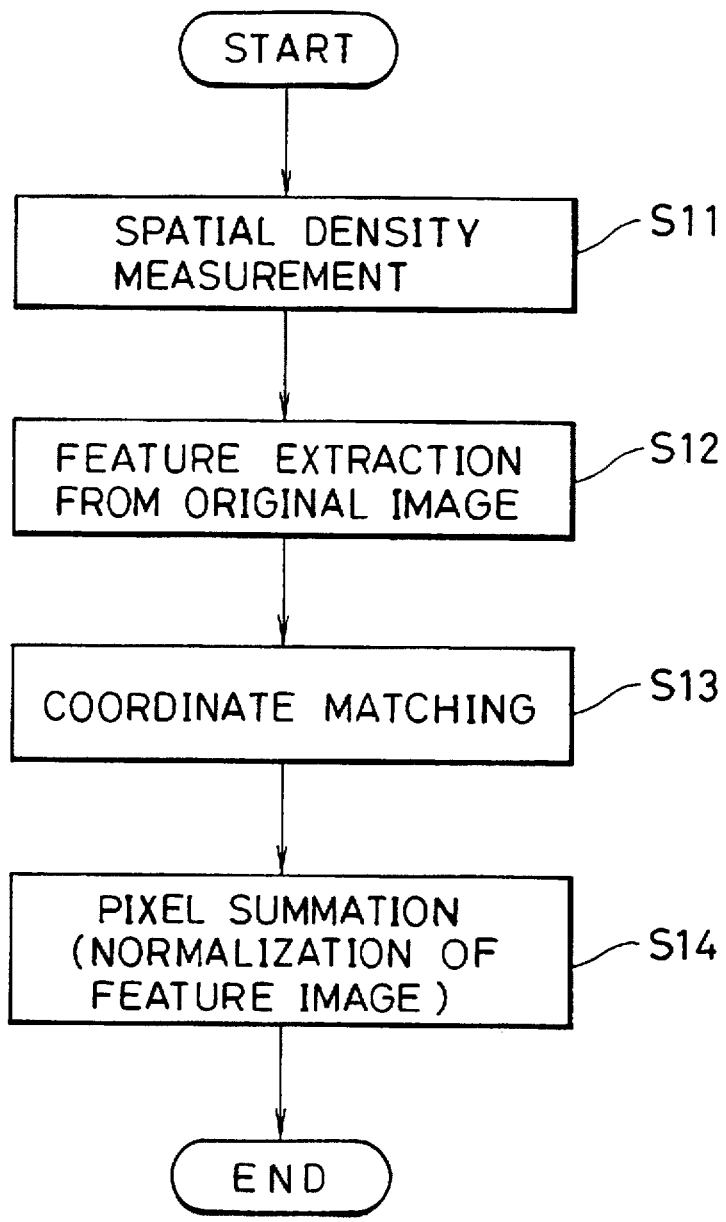
FIG. 28 is a flowchart showing the normalization processing and feature extraction processing of an image using the seventh to twelfth embodiments.

FIG. 28 is a flowchart illustrating the steps of image normalization processings common to the seventh to twelfth embodiments of the present invention.

As is clear from this figure, the normalization in accordance with the present invention is divided into the following four steps: a spatial density measurement processing at step S11; a feature extraction processing from an original image at step S12; a coordinate matching processing at step S13; and a pixel summation processing (the normalization of a feature image) at step S14. These processings will be described in more detail.

(1) SPATIAL DENSITY MEASUREMENT PROCESSING (STEP S11)

Let us assume, as in the first to sixth embodiments, that a two-dimensional pattern obtained by sampling an unknown character or figure to be recognized at a sampling interval ν is expressed as expression (6), and the corresponding values on the continuous coordinate system are given by equation (7) under the conditions of expressions (8) and (9).

It is further assumed that an infinite number of two dimensional patterns f(x,y) are oriented in the same direction and are arrayed on an infinite plane R as shown in FIGS. 2 and 3. The spatial density $\rho(X_i, Y_j)$ at a point $(X_i, Y_j)$ is obtained on this plane by the following process.

First, locations L1 and L2 of rising edges and locations L3 and L4 of falling edges in the X direction are detected using equations (10)–(13). The locations in the Y direction are obtained in a similar manner.

Second, the line pitches $L_x$ and $L_y$ in the X and Y directions are obtained by using equations (14) and (15) and similar equations. Then, the spatial density $\rho(X_i, Y_j)$ is calculated using equation (16).

Subsequently, the projective functions $hx(X_i)$ and $hy(Y_j)$ of the spatial density $\rho(X_i, Y_j)$ to the X and Y directions are obtained using equations (17) and (18). Thus, the spatial densities $hx(X_i)$ and $hy(Y_j)$ are measured.

(2) FEATURE EXTRACTION FROM AN ORIGINAL IMAGE (STEP S12)

The feature extraction processing forms a feature image by processing an original image $f(X_i, Y_j)$ using a 3×3 mask operation. The mask operation is performed as described above. With regard to the mask operation, the description on pages 331–335 of "ROBOTICS", K. S. FU, 1987, McGRAW-HILL, Inc is incorporated here by reference.

(3) ADJUSTING OF COORDINATES (STEP S13)

Figure 29:
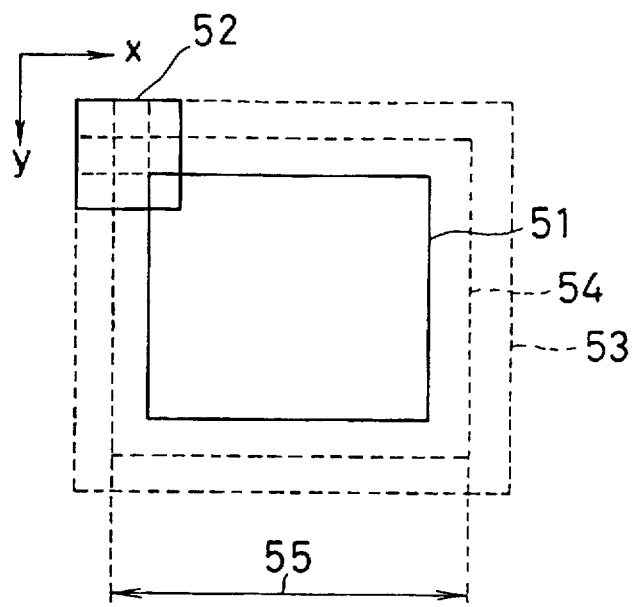
FIG. 29 is a schematic diagram illustrating the feature extraction range in accordance with the seventh embodiment.
Figure 30:
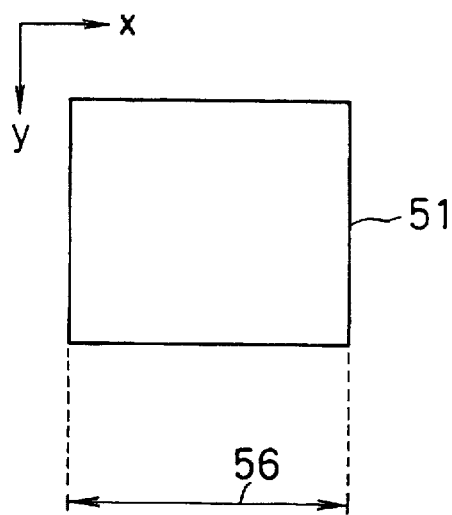
FIG. 30 is a schematic diagram illustrating the measurement range of the spatial density in accordance with the seventh embodiment.

At this step, matching between the coordinates of the spatial density and those of the feature image is achieved. FIG. 29 illustrates the difference between the coordinates of the spatial density and those of the feature image. In this figure, reference numeral 51 denotes the original image; 52, the 3×3 mask for the feature extraction; 53, the moving range of the mask 52; 54, the feature image; and 55, the width of the feature image 54. The frame of the feature image 54 is greater than that of the original image 51 because the feature extraction is carried out within the frame of the feature image 54 whereas the spatial density is defined within the frame of the original image 51. FIG. 30 illustrates the width 56 of the original image 51.

Figure 31:
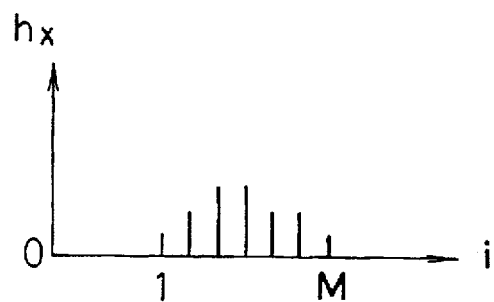
FIG. 31 is a diagram illustrating the spatial density before extension in accordance with the seventh embodiment.
Figure 32:
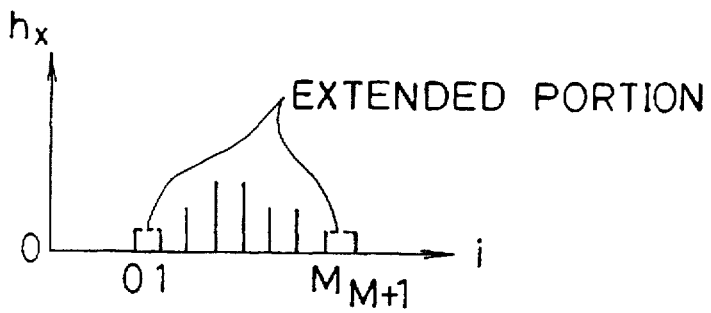
FIG. 32 is a diagram illustrating the spatial density after extension in accordance with the seventh embodiment.

As seen from FIGS. 29 and 30, the width 55 of the feature image 54 exceeds the width 56 of the original image 56 by one pixel on each side. The features of the outermost pixels of the feature image 54 are generated on the basis of the inner adjacent pixels belonging to the original image 51, and hence, the difference of the coordinates between the two images 51 and 54 are adjusted by defining the spatial density of the outermost pixels of the feature image 54 as identical to those of the inner adjacent pixels which belong to the original image 51. FIGS. 31 and 32 illustrate this relationship: FIG. 31 illustrates the spatial density before the extension; and FIG. 32, after the extension.

(4) SUMMATION OF PIXELS (STEP S14)

Figure 34:
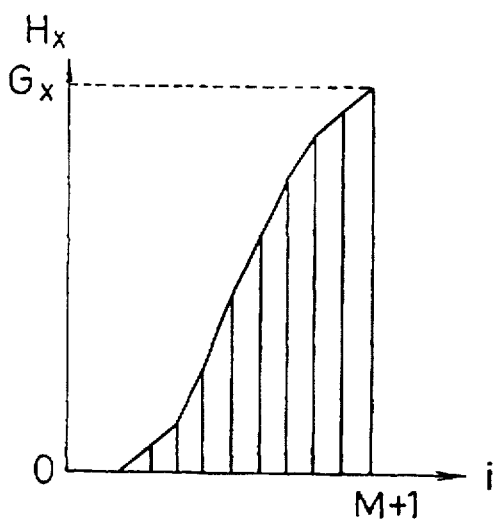
FIG. 34 is a diagram illustrating the cumulative function of the spatial function of FIG. 33.

At this step, the cumulative functions hx and $H_y$ of the spatial density are defined as shown in FIG. 34. The cumulative functions give summation maps used to divide the feature image into new pixels, thus giving the normalized image of the feature image. To achieve this, the cumulative functions hx and $H_y$ of the feature image are defined by the following equations (33) and (34).

$$Hy(j) = \sum_{k=0}^{i} hy(k) \ (j = 0, 1, \ldots, N+1) \tag{33}$$

$$G_x = H_x(M+1). \tag{34}$$

In equations (33) and (34), M is the number of pixels in the lateral direction of the original image 51, and N is the number of pixels in the vertical direction thereof. The terms hx(0), hy(0), hx(M+1) and hy(N+1) are created by the adjustment of the coordinates.

Next, the total sums Gx and Gy of the spatial density are defined by equations (35) and (36).

$$G_x = H_x(M+1) \tag{35}$$

$$G_y = H_y(N+1) \tag{36}$$

Figure 33:
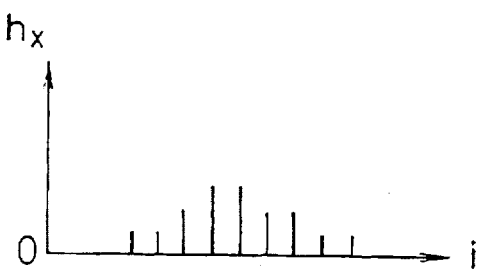
FIG. 33 is a diagram illustrating the spatial density in accordance with the seventh embodiment.

FIGS. 33 and 34 illustrate this. The total sum Gx of the spatial density is obtained as shown in FIG. 34 by sequentially adding hx(i) as shown in FIG. 33.

To define the cumulative functions hx and $H_y$ on the continuous coordinate system, Hx is defined by the following equation (37) for x in an interval [i, i+1], and Hy is similarly defined by equation (38) in an interval [j, j+1].

$$H_x(x) = (x-i)H_x(i+1) + (i+1-x)H_x(i) \tag{37}$$

$$H_y(y) = (y-j)H_y(j+1) + (j+1-y)H_y(j) \tag{38}$$

Figure 35:
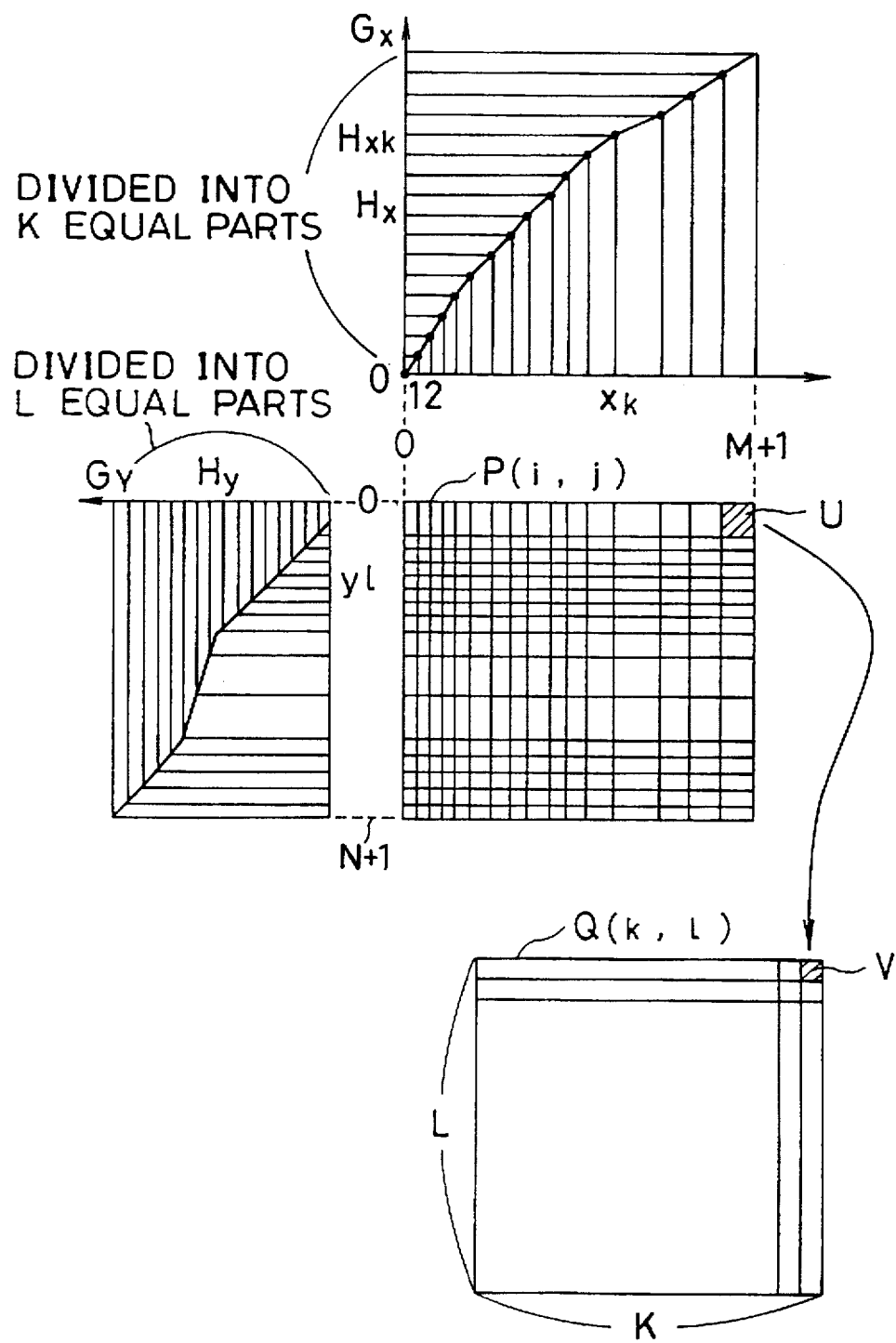
FIG. 35 is a diagram illustrating the summation processings of pixels in accordance with the seventh embodiment.

Subsequently, as shown in FIG. 35, map coordinate sequences $X_k$ and $y_l$ are calculated by applying equations (39) and (40) to the cumulative spatial densities $H_x$ and $H_y$.

$$xk = \left\{ \ xlH_x(x) = k \cdot \frac{Gx}{K} \ \right\} \tag{39}$$

$$yl = \left\{ \ ylH_y(y) = l \cdot \frac{Gy}{L} \ \right\} \tag{40}$$

More specifically, the map coordinate sequence $X_k$ is obtained as follows: First, the interval Gx is divided into K equal intervals, and the k-th divided point is denoted by $H_{xk}$; second, the intersection of the horizontal line passing through $H_{xk}$ with the cumulative function $H_x$ is computed;

and finally, $X_k$ is obtained as the x coordinate of the intersection. Likewise, the sequence $y_l$ is obtained from the cumulative function $H_y$.

The map coordinate sequences $X_k$ and $y_l$ define the coordinates of the feature image $\rho(i,j)$ (i=0, 1, ..., M, M+1, j=0, 1, ..., N, N+1) as shown in FIG. 35, and hence, the feature image P(i,j) is obtained from the original image $f(X_i,Y_j)$ (i=1, 2, ..., M, j=1, 2, ..., N). Then, the normalized image Q(k,l) (k=1, 2, ..., K, l=1, 2, ... L) is formed from the feature image P(i,j).

In the course of this, the feature image P(i,j) defined on the discrete (i,j) plane is extended to a continuous function P(x,y) using the following equation (41).

$$P(x, y) = P([x]+1, [y]+1) \tag{41}$$

where [ ] denotes the Gauss' notation. For example, [x] represents the maximum integer that does not exceed x.

Then, the function P(x,y) is integrated to calculate the normalized value Q(k,l) by using equation (42). The integral range is indicated by U of FIG. 35, which corresponds to the range V of the normalized Q plane.

$$Q(k, l) = \int_{y_{l-1}}^{y_l} \int_{x_{k-1}}^{x_k} P(x, y) dx dy \tag{42}$$

Figure 36:
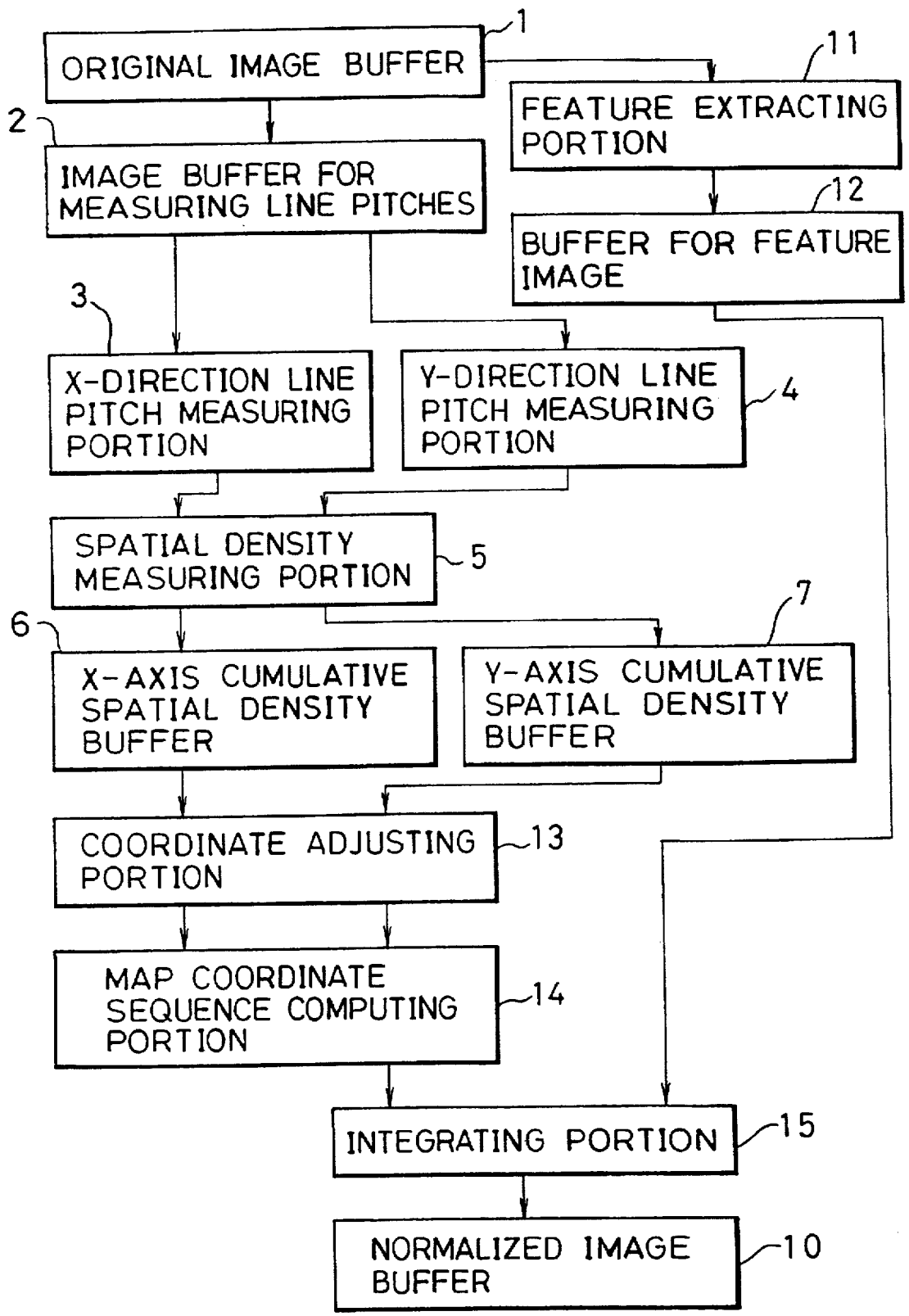
FIG. 36 is a block diagram showing the arrangement of seventh to twelfth embodiments of an apparatus for nonlinear normalization of an image in accordance with the present invention.
Figure 37A:
FIGS. 37A–37C are diagrams illustrating normalized images in accordance with conventional normalizing methods.
Figure 37B:
Figure 37C:
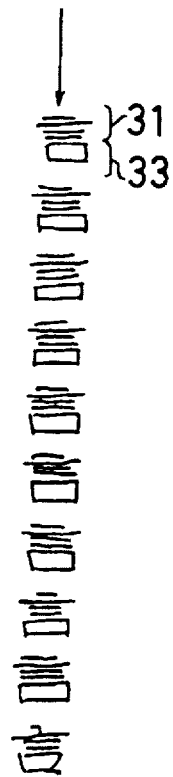

FIG. 36 is a block diagram illustrating the arrangement of the seventh to twelfth embodiments where the corresponding elements are designated by the same reference numerals as in FIG. 1. In this embodiment, a feature extracting portion 11, a buffer 12 for the feature image, a coordinate adjusting portion 13, a map coordinate sequence computing portion 14, and an integrating portion 15 are added.

In this arrangement, the above-described processings are performed as follows: (1) the spatial density measurement processing is carried out by the X-direction line pitch measuring portion 3, the Y-direction line pitch measuring portion 4, and the spatial density measuring portion 5; (2) the feature extraction processing is performed by the feature extracting portion 11, and the feature image is stored in the buffer 11 for the feature image; and (3) the adjusting of the coordinates is performed by the coordinate adjusting portion 13.

The map coordinate sequence computing portion 14 calculates the map coordinate sequences $X_k$ and $y_l$ as shown in FIG. 35, which determines the integral range U of the feature image. Accordingly, (4) summation of the pixels are executed, and the normalized feature image is obtained. This image is stored in the buffer 10 for the normalized image.

Thus, as shown in FIG. 36, (1) spatial density measurement processing and (2) feature extraction processing from the original image are carried out in parallel, and (3) adjusting of the coordinates and computing of map coordinate sequence are performed, followed by (4) the summation of the pixels, thus the nonlinear normalization of the feature image being accomplished.

The configuration of FIG. 36 is shared from the seventh to twelfth embodiments of the present invention. Only the operation of the spatial density measuring portion 5 is different.

EMBODIMENT 8

In this embodiment, it is assumed, as in the seventh embodiment, that an infinite number of two-dimensional patterns $f(X_i, Y_j)$ (i=1–M, j=1–N) which are formed by sampling an original image at the sampling interval $\gamma$ are arrayed in both the X and Y directions on an infinite plane R in such a manner that they are oriented in the same direction, as shown in FIG. 2, and that the feature extraction is performed from the two-dimensional patterns $f(X_i, Y_j)$ using a 3×3 mask pattern. The spatial density $\rho(X_i, Y_j)$ at a point $(X_i,Y_j)$ is obtained on this plane by the following process.

First, the line pitches $L_x$ and $L_y$ in the X and Y directions are obtained by using equations (14) and (15) and similar equations.

Subsequently, the spatial density $\rho(X_i, Y_j)$ is calculated as the sum of reciprocals of the line pitches $L_x$ and $L_y$ in accordance with equation (31).

Then, the projective functions hx(Xi) and hy(Yj) of the spatial density $\rho(X_i, Y_j)$ to the X and Y directions are obtained using equations (17) and (18), followed by the calculation of the cumulative functions $H_x$ and $H_y$ using equations (33) and (34).

After that, the total sums Gx and Gy of the spatial density are calculated using equations (35) and (36), followed by the computation of the summed up map coordinate sequences $X_k$ and $y_l$ using equations (39) and (40).

Finally, the normalized feature image Q is obtained by performing the integral given by equation (42) using the map coordinate sequences $X_k$ and $y_l$. The input image and the integral range in this case is as shown in FIGS. 10 and 11, for example.

EMBODIMENT 9

In this embodiment, it is assumed, as in the seventh embodiment, that an infinite number of two-dimensional patterns $f(X_i, Y_j)$ (i=1–M, j=1–N) which are formed by sampling an original image at the sampling interval $\gamma$ are arrayed in both the X and Y directions on an infinite plane R in such a manner that they are oriented in the same direction, as shown in FIG. 2, and that the feature extraction is performed from the two-dimensional pattern $f(X_i, Y_j)$ using 3×3 mask pattern. The spatial density $\rho(X_i, Y_j)$ at a point $(X_i,Y_j)$ is obtained on this plane by the following process.

First, the line pitches $L_x$ and $L_y$ in the X and Y directions are obtained by using equations (14) and (15) and similar equations.

Subsequently, the spatial density $\rho(X_i, Y_j)$ is calculated as the reciprocal of the sum of the line pitches $L_x$ and $L_y$ in accordance with equation (32).

Then, the projective functions hx($X_i$) and hy($Y_j$) of the spatial density $\rho(X_i, Y_j)$ to the X and Y directions are obtained using equations (17) and (18), followed by the calculation of the cumulative functions $H_x$ and $H_y$ using equations (33) and (34).

After that, the total sums Gx and Gy of the spatial density are calculated using equations (35) and (36), followed by the computation of the summed up map coordinate sequences $X_k$ and $y_l$ using equations (39) and (40).

Finally, the normalized feature image Q is obtained by performing the integral given by equation (42) using the map coordinate sequences $X_k$ and $y_l$. The input image and the integral range in this case is as shown in FIGS. 13 and 14, for example.

EMBODIMENT 10

In this embodiment, it is assumed that the infinite number of two-dimensional patterns $f(X_i, Y_j)$ (i=1–M, j=1–N) which are formed by sampling an original image at the sampling interval $\gamma$ are arrayed in both X and Y directions on a plane at infinity R in such a manner that the four neighboring patterns in the vertical and lateral directions of any pattern are disposed line symmetrically as shown in FIGS. 16 and 17, and that the feature extraction is performed from the two-dimensional patterns f($X_i$, $Y_j$) using 3×3 mask pattern as in the seventh embodiment. The spatial density $\rho(X_i, Y_j)$ at a point ($X_i, Y_j$) is obtained on this plane by the following process.

First, the line pitches $L_x$ and $L_y$ in the X and Y directions are obtained by using equations (14) and (15) and similar equations.

Subsequently, the spatial density $\rho(X_i, Y_j)$ is calculated as the product of reciprocals of the line pitches $L_x$ and $L_y$ in accordance with equation (16).

Then, the projective functions hx($X_i$) and hy($Y_j$) of the spatial density $\rho(X_i, Y_j)$ to the X and Y directions are obtained using equations (17) and (18), followed by the calculation of the cumulative functions $H_x$ and $H_y$ using equations (33) and (34).

After that, the total sums Gx and Gy of the spatial density are calculated using equations (35) and (36), followed by the computation of the summed up map coordinate sequences $X_k$ and $y_l$ using equations (39) and (40).

Finally, the normalized feature image Q is obtained by performing the integral given by equation (42) using the map coordinate sequences $X_k$ and $y_l$. The input image and the integral range in this case is as shown in FIGS. 18 and 19, for example.

EMBODIMENT 11

In this embodiment, it is assumed, as in the seventh embodiment, that the infinite number of two-dimensional patterns f($X_i$, $Y_j$) (i=1–M, j=1–N) which are formed by sampling an original image at the sampling interval γ are arrayed in both X and Y directions on a plane at infinity R in such a manner that the four neighboring patterns in the vertical and lateral directions of any pattern are disposed line symmetrically as shown in FIGS. 16 and 17, and that the feature extraction is performed from the two-dimensional patterns f($X_i$, $Y_j$) using 3×3 mask pattern as in the seventh embodiment. The spatial density $\rho(X_i, Y_j)$ at a point ($X_i, Y_j$) is obtained on this plane by the following process.

First, the line pitches $L_x$ and $L_y$ in the X and Y directions are obtained by using equations (14) and (15) and similar equations.

Subsequently, the spatial density $\rho(X_i, Y_j)$ is calculated as the sum of reciprocals of the line pitches $L_x$ and $L_y$ in accordance with equation (31).

Then, the projective functions hx($X_i$) and hy($Y_j$) of the spatial density $\rho(X_i, Y_j)$ to the X and Y directions are obtained using equations (17) and (18), followed by the calculation of the cumulative functions $H_x$ and $H_y$ using equations (33) and (34).

After that, the total sums Gx and Gy of the spatial density are calculated using equations (35) and (36), followed by the computation of the summed up map coordinate sequences $X_k$ and $y_l$ using equations (39) and (40).

Finally, the normalized feature image Q is obtained by performing the integral given by equation (42) using the map coordinate sequences $X_k$ and $y_l$. The input image and the integral range in this case is as shown in FIGS. 21 and 22, for example.

EMBODIMENT 12

In this embodiment, it is assumed, as in the seventh embodiment, that the infinite number of two-dimensional patterns f($X_i$, $Y_j$) (i=1–M, j=1–N) which are formed by sampling an original image at the sampling interval γ are arrayed in both X and Y directions on a plane at infinity R in such a manner that the four neighboring patterns in the vertical and lateral directions of any pattern are disposed line symmetrically as shown in FIGS. 16 and 17, and that the feature extraction is performed from the two-dimensional patterns f($X_i$, $Y_j$) using 3×3 mask pattern as in the seventh embodiment. The spatial density $\rho(X_i, Y_j)$ at a point ($X_i, Y_j$) is obtained on this plane by the following process.

First, the line pitches $L_x$ and $L_y$ in the X and Y directions are obtained by using equations (14) and (15).

Subsequently, the spatial density $\rho(X_i, Y_j)$ is calculated as the reciprocal of the sum of the line pitches $L_x$ and $L_y$ in accordance with equation (32).

Then, the projective functions hx($X_i$) and hy($Y_j$) of the spatial density $\rho(X_i, Y_j)$ to the X and Y directions are obtained using equations (17) and (18), followed by the calculation of the cumulative functions $H_x$ and $H_y$ using equations (33) and (34).

After that, the total sums Gx and Gy of the spatial density are calculated using equations (35) and (36), followed by the computation of the summed up map coordinate sequences $X_k$ and $y_l$ using equations (39) and (40).

Finally, the normalized feature image Q is obtained by performing the integral given by equation (42) using the map coordinate sequences v and $y_l$. The input image and the integral range in this case is as shown in FIGS. 24 and 25, for example.

Although it is assumed in the embodiments described above that the infinite number of two-dimensional patterns f($X_i$, $Y_j$) which are formed by sampling an original image at the sampling interval γ are arrayed in both X and Y directions on a plane at infinity R as illustrated in FIGS. 2 and 16, this assumption is not essential. It may be assumed that only four neighboring patterns of the two-dimensional pattern f($X_i$, $Y_j$) in the vertical and lateral directions are the same pattern as illustrated in FIGS. 3 and 17.

Furthermore, although the feature amounts associated with edges are extracted by the 3×3 mask in the embodiments described above, other features such as boundary direction features can be extracted using other types of masks.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An apparatus for nonlinear normalization of an image, which performs pre-processing for computing the correlation between an unknown character and a reference pattern, the unknown character being formed of lines and having a line pitch in the X direction and a line pitch in the Y direction, said apparatus comprising:

means for obtaining a local spatial density function $\rho(X_i, Y_j)$ (i=1–I, j=1–J) from a two-dimensional pattern f($X_i$, $Y_j$) which is obtained by sampling said unknown character at a sampling interval γ, said spatial density function $\rho(X_i, Y_j)$ being obtained as a correlate of both the line pitch in the X direction and the line pitch in the Y direction;

means for computing an X-direction cumulative function hx(Xi) by successively adding said spatial density function $\rho(X_i, Y_j)$ while $Y_j$ is varied from $Y_1$ to $Y_J$ and $X_i$ is fixed;

means for computing a Y-direction cumulative function $hy(Y_j)$ by successively adding said spatial density function $\rho(X_i, Y_j)$ while Xi is varied from $X_1$ to $X_I$ and $Y_j$ is fixed;

means for extending said cumulative functions $hx(X_i)$ and $hy(Y_j)$ into continuous cumulative functions $hx(X)$ and $hy(Y)$, respectively;

means for determining new sampling points $(X_i, Y_j)$ at new sampling intervals ($\delta i$, $\epsilon j$) in the X and Y directions, the new sampling intervals satisfying the condition that the product of said cumulative function $hx(X_i)$ and $\delta i$ takes a first fixed value, and the product of said cumulative function $hy(Y_j)$ and $\epsilon j$ takes a second fixed value; and means for computing normalized sampled values at said new sampling points $(X_i, Y_j)$ by resampling said unknown character or by performing a computation on said two-dimensional pattern $f(X_i, Y_j)$.

wherein said correlate of both the line pitch in the X direction and the line pitch in the Y direction is a function of the product of the reciprocals of said line pitches in the X and Y directions.

2. An apparatus for nonlinear normalization of an image as claimed in claim 1, further comprising means for storing the unknown character.

3. An apparatus for nonlinear normalization of an image, which performs pre-processing for computing the correlation between an unknown character and a reference pattern, the unknown character being formed of lines and having a line pitch in the X direction and a line pitch in the Y direction, said apparatus comprising:

means for obtaining a local spatial density function $\rho(X_i, Y_j)$ (i=1–I, j=1–J) from a two-dimensional pattern $f(X_i, Y_j)$ which is obtained by sampling said unknown character at a sampling interval $\gamma$, said spatial density function $\rho(X_i, Y_j)$ being obtained as a correlate of both the line pitch in the X direction and the line pitch in the Y direction;

means for computing an X-direction cumulative function hx(Xi) by successively adding said spatial density function $\rho(X_i, Y_j)$ while $Y_j$ is varied from $Y_1$ to $Y_J$ and $X_i$ is fixed;

means for computing a Y-direction cumulative function $hy(Y_j)$ by successively adding said spatial density function $\rho(X_i, Y_j)$ while Xi is varied from $X_1$ to $X_I$ and $Y_j$ is fixed;

means for extending said cumulative functions $hx(X_i)$ and $hy(Y_j)$ into continuous cumulative functions $hx(X)$ and $hy(Y)$, respectively;

means for determining new sampling points $(X_i, Y_j)$ at new sampling intervals ($\delta i$, $\epsilon j$) in the X and Y directions, the new sampling intervals satisfying the condition that the product of said cumulative function $hx(X_i)$ and $\delta i$ takes a first fixed value, and the product of said cumulative function $hy(Y_j)$ and $\epsilon j$ takes a second fixed value; and means for computing normalized sampled values at said new sampling points $(X_i, Y_j)$ by resampling said unknown character or by performing a computation on said two-dimensional pattern $f(X_i, Y_j)$.

wherein said correlate of both the line pitch in the X direction and the line pitch in the Y direction is the sum of a term which includes the reciprocal of the line pitch in the X direction and a term which includes the reciprocal of the line pitch in the Y direction.

4. An apparatus for nonlinear normalization of an image as claimed in claim 3, further comprising means for storing the unknown character.

5. An apparatus for nonlinear normalization of an image, which performs pre-processing for computing the correlation between an unknown character and a reference pattern, the unknown character being formed of lines and having a line pitch in the X direction and a line pitch in the Y direction, said apparatus comprising:

means for obtaining a local spatial density function $\rho(X_i, Y_j)$ (i=1–I, j=1–J) from a two-dimensional pattern $f(X_i, Y_j)$ which is obtained by sampling said unknown character at a sampling interval $\gamma$, said spatial density function $\rho(X_i, Y_j)$ being obtained as a correlate of both the line pitch in the X direction and the line pitch in the Y direction;

means for computing an X-direction cumulative function hx(Xi) by successively adding said spatial density function $\rho(X_i, Y_j)$ while $Y_j$ is varied from $Y_1$ to $Y_J$ and $X_i$ is fixed;

means for computing a Y-direction cumulative function $hy(Y_j)$ by successively adding said spatial density function $\rho(X_i, Y_j)$ while Xi is varied from $X_1$ to $X_I$ and $Y_j$ is fixed;

means for extending said cumulative functions $hx(X_i)$ and $hy(Y_j)$ into continuous cumulative functions $hx(X)$ and $hy(Y)$, respectively;

means for determining new sampling points $(X_i, Y_j)$ at new sampling intervals ($\delta i$, $\epsilon j$) in the X and Y directions, the new sampling intervals satisfying the condition that the product of said cumulative function $hx(X_i)$ and $\delta i$ takes a first fixed value, and the product of said cumulative function $hy(Y_j)$ and $\epsilon j$ takes a second fixed value; and means for computing normalized sampled values at said new sampling points $(X_i, Y_j)$ by resampling said unknown character or by performing a computation on said two-dimensional pattern $f(X_i, Y_j)$.

wherein said correlate of both the line pitch in the X direction and the line pitch in the Y direction is the reciprocal of the sum of a term which includes the line pitch in the X direction and a term which includes the line pitch in the Y direction.

6. An apparatus for nonlinear normalization of an image, which performs pre-processing for computing the correlation between an unknown character and a reference pattern, the unknown character being formed of lines and having a line pitch in the X direction and a line pitch in the Y direction, said apparatus comprising:

means for obtaining a set of feature parameters from a two-dimensional pattern $f(X_i, Y_j)$ (i=1–M, j=1–N) which is obtained by sampling said unknown character at a sampling interval $\gamma$;

means for computing a local spatial density function $\rho(X_i, Y_j)$ from said two-dimensional pattern $f(X_i, Y_j)$, said spatial density function $\rho(X_i, Y_j)$ being obtained as a correlate of both the line ditch in the X direction and the line pitch in the Y direction;

means for computing an X-direction cumulative function $hx(X_i)$ by successively adding said spatial density function $\rho(X_i, Y_j)$ while $Y_j$ is varied from $Y_1$ to $Y_J$ and $X_i$ is fixed;

means for computing a Y-direction cumulative function $hy(Y_j)$ by successively adding said spatial density function $\rho(X_i, Y_j)$ while Xi is varied from $X_1$ to $X_I$ and $Y_j$ is fixed;

means for extending said cumulative functions hx($X_i$) and hy($Y_j$) into continuous cumulative functions $h_x(X)$ and $h_y(Y)$, respectively;

means for matching coordinates of said set of feature parameters and coordinates of said spatial density function ρ($X_i$, $Y_j$); and means for determining new sampling points ($X_i$, $Y_j$) of said set of feature parameters at new sampling intervals (δi, εj) in the X and Y directions, the new sampling intervals satisfying the condition that the product of said cumulative function hx($X_i$) and δi takes a first fixed value, and the product of said cumulative function hy($y_j$) and εj takes a second fixed value, wherein said correlate of both the line pitch in the X direction and the line pitch in the Y direction is a function of the product of the reciprocals of said line pitches in the X and Y directions.

7. An apparatus for nonlinear normalization of an image as claimed in claim 6, further comprising means for storing the unknown character.

8. An apparatus for nonlinear normalization of an image, which performs pre-processing for computing the correlation between an unknown character and a reference pattern, the unknown character being formed of lines and having a line pitch in the X direction and a line pitch in the Y direction, said apparatus comprising:

means for obtaining a set of feature parameters from a two-dimensional pattern f($X_i$, $Y_j$) (i=1–M, j=1–N) which is obtained by sampling said unknown character at a sampling interval γ;

means for computing a local spatial density function ρ($X_i$, $Y_j$) from said two-dimensional pattern f($X_i$, $Y_j$), said spatial density function ρ($X_i$, $Y_j$) being obtained as a correlate of both the line pitch in the X direction and the line pitch in the Y direction;

means for computing an X-direction cumulative function hx($X_i$) by successively adding said spatial density function ρ($X_i$, $Y_j$) while $Y_j$ is varied from $Y_1$ to $Y_J$ and $X_i$ is fixed;

means for computing a Y-direction cumulative function hy($Y_j$) by successively adding said spatial density function ρ($X_i$, $Y_j$) while Xi is varied from $X_1$ to $X_I$ and $Y_j$ is fixed;

means for extending said cumulative functions hx($X_i$) and hy($Y_j$) into continuous cumulative functions $h_x(X)$ and $h_y(Y)$, respectively;

means for matching coordinates of said set of feature parameters and coordinates of said spatial density function ρ($X_i$, $Y_j$); and means for determining new sampling points ($X_i$, $Y_j$) of said set of feature parameters at new sampling intervals (δi, εj) in the X and Y directions, the new sampling intervals satisfying the condition that the product of said cumulative function hx($X_i$) and δi takes a first fixed value, and the product of said cumulative function hy($Y_j$) and εj takes a second fixed value, wherein said correlate of both the line pitch in the X direction and the line pitch in the Y direction is the sum of a term which includes the reciprocal of the line pitch in the X direction and a term which includes the reciprocal of the line pitch in the Y direction.

9. An apparatus for nonlinear normalization of an image as claimed in claim 8, further comprising means for storing the unknown character.

10. An apparatus for nonlinear normalization of an image, which performs pre-processing for computing the correlation between an unknown character and a reference pattern, the unknown character being formed of lines and having a line pitch in the X direction and a line pitch in the Y direction, said apparatus comprising:

means for obtaining a set of feature parameters from a two-dimensional pattern f($X_i$, $Y_j$) (i=1–M, j=1–N) which is obtained by sampling said unknown character at a sampling interval γ;

means for computing a local spatial density function ρ($X_i$, $Y_j$) from said two-dimensional pattern f($X_i$, $Y_j$), said spatial density function ρ($X_i$, $Y_j$) being obtained as a correlate of both the line pitch in the X direction and the line pitch in the Y direction;

means for computing an X-direction cumulative function hx($X_i$) by successively adding said spatial density function ρ($X_i$, $Y_j$) while $Y_j$ is varied from $Y_1$ to $Y_J$ and $X_i$ is fixed;

means for computing a Y-direction cumulative function hy($Y_j$) by successively adding said spatial density function ρ($X_i$, $Y_j$) while Xi is varied from $X_1$ to $X_I$ and $Y_j$ is fixed;

means for extending said cumulative functions hx($X_i$) and hy($Y_j$) into continuous cumulative functions $h_x(X)$ and $h_y(Y)$, respectively;

means for matching coordinates of said set of feature parameters and coordinates of said spatial density function ρ($X_i$, $Y_j$); and means for determining new sampling points ($X_i$, $Y_j$) of said set of feature parameters at new sampling intervals (δi, εj) in the X and Y directions, the new sampling intervals satisfying the condition that the product of said cumulative function hx($X_i$) and δi takes a first fixed value, and the product of said cumulative function hy($Y_j$) and εj takes a second fixed value, wherein said correlate of both the line pitch in the X direction and the line pitch in the Y direction is the reciprocal of the sum of a term which includes the line pitch in the X direction and a term which includes the line pitch in the Y direction.

11. A method for nonlinear normalization of an image, which performs pre-processing for computing the correlation between an unknown character and a reference pattern, the unknown character being formed of lines and having a line pitch in the X direction and a line pitch in the Y direction, said method comprising the steps of:

obtaining a local spatial density function ρ($X_i$, $Y_j$) (i=1–I, j=1–J) from a two-dimensional pattern f($X_i$, $Y_j$) which is obtained by sampling said unknown character at a sampling interval γ, said spatial density function ρ($X_i$, $Y_j$) being obtained as a correlate of both the line pitch in the X direction and the line pitch in the Y direction;

computing an X-direction cumulative function hx($X_i$) by successively adding said spatial density function ρ($X_i$, $Y_j$) while $Y_j$ is varied from $Y_1$ to $Y_J$ and $X_i$ is fixed;

computing a Y-direction cumulative function hy($Y_j$) by successively adding said spatial density function ρ($X_i$, $Y_j$) while $X_i$ is varied from $X_1$ to $X_I$ and $Y_j$ is fixed;

extending said cumulative functions hx($X_i$) and hy($Y_j$) into continuous cumulative functions hx(X) and hy(Y), respectively;

determining new sampling points ($X_i$, $Y_j$) at new sampling intervals (δi, εj) in the X and Y directions, the new sampling intervals satisfying the condition that the product of said cumulative function hx($X_i$) and δi takes a first fixed value, and the product of said cumulative function hy($Y_j$) and εj takes a second fixed value; and computing normalized sampled values at said new sampling points $(X_i, Y_j)$ by resampling said unknown character or by performing a computation on said two-dimensional pattern $f(X_i, Y_j)$, wherein said correlate of both the line pitch in the X direction and the line pitch in the Y direction is a function of the product of the reciprocals of said line pitches in the X and Y directions.

12. A method for nonlinear normalization of an image as claimed in claim 11, further comprising the step of storing the unknown character in a buffer before the local spatial density function is obtained.

13. A method for nonlinear normalization of an image, which performs pre-processing for computing the correlation between an unknown character and a reference pattern, the unknown character being formed of lines and having a line pitch in the X direction and a line pitch in the Y direction, said method comprising the steps of:

obtaining a local spatial density function $\rho(X_i, Y_j)$ (i=1–I, j=1–J) from a two-dimensional pattern $f(X_i, Y_j)$ which is obtained by sampling said unknown character at a sampling interval $\gamma$, said spatial density function $\rho(X_i, Y_j)$ being obtained as a correlate of both the line pitch in the X direction and the line pitch in the Y direction;

computing an X-direction cumulative function $hx(X_i)$ by successively adding said spatial density function $\rho(X_i, Y_j)$ while $Y_j$ is varied from $Y_1$ to $Y_J$ and $X_i$ is fixed;

computing a Y-direction cumulative function $hy(Y_j)$ by successively adding said spatial density function $\rho(X_i, Y_j)$ while $X_i$ is varied from $X_1$ to $X_I$ and $Y_j$ is fixed;

extending said cumulative functions $hx(X_i)$ and $hy(Y_j)$ into continuous cumulative functions $hx(X)$ and $hy(Y)$, respectively;

determining new sampling points $(X_i, Y_j)$ at new sampling intervals $(\delta i, \epsilon j)$ in the X and Y directions, the new sampling intervals satisfying the condition that the product of said cumulative function $hx(X_i)$ and $\delta i$ takes a first fixed value, and the product of said cumulative function $hy(Y_j)$ and $\epsilon j$ takes a second fixed value; and computing normalized sampled values at said new sampling points $(X_i, Y_j)$ by resampling said unknown character or by performing a computation on said two-dimensional pattern $f(X_i, Y_j)$, wherein said correlate of both the line pitch in the X direction and the line pitch in the Y direction is the sum of a term which includes the reciprocal of the line pitch in the X direction and a term which includes the reciprocal of the line pitch in the Y direction.

14. A method for nonlinear normalization of an image, which performs pre-processing for computing the correlation between an unknown character and a reference pattern, the unknown character being formed of lines and having a line pitch in the X direction and a line pitch in the Y direction, said method comprising the steps of:

obtaining a local spatial density function $\rho(X_i, Y_j)$ (i=1–I, j=1–J) from a two-dimensional pattern $f(X_i, Y_j)$ which is obtained by sampling said unknown character at a sampling interval $\gamma$, said spatial density function $\rho(X_i, Y_j)$ being obtained as a correlate of both the line pitch in the X direction and the line pitch in the Y direction;

computing an X-direction cumulative function $hx(X_i)$ by successively adding said spatial density function $\rho(X_i, Y_j)$ while $Y_j$ is varied from $Y_1$ to $Y_J$ and $X_i$ is fixed;

computing a Y-direction cumulative function $hy(Y_j)$ by successively adding said spatial density function $\rho(X_i, Y_j)$ while $X_i$ is varied from $X_1$ to $X_I$ and $Y_j$ is fixed;

extending said cumulative functions $hx(X_i)$ and $hy(Y_j)$ into continuous cumulative functions $hx(X)$ and $hy(Y)$, respectively;

determining new sampling points $(X_i, Y_j)$ at new sampling intervals $(\delta i, \epsilon j)$ in the X and Y directions, the new sampling intervals satisfying the condition that the product of said cumulative function $hx(X_i)$ and $\delta i$ takes a first fixed value, and the product of said cumulative function $hy(Y_j)$ and $\epsilon j$ takes a second fixed value; and computing normalized sampled values at said new sampling points $(X_i, Y_j)$ by resampling said unknown character or by performing a computation on said two-dimensional pattern $f(X_i, Y_j)$, wherein said correlate of both the line pitch in the X direction and the line pitch in the Y direction is the reciprocal of the sum of a term which includes the line pitch in the X direction and a term which includes the line pitch in the Y direction.

15. A method for nonlinear normalization of an image as claimed in claim 14, further comprising the step of storing the unknown character in a buffer before the local spatial density function is obtained.

16. A method for nonlinear normalization of an image, which performs pre-processing for computing the correlation between an unknown character and a reference pattern, the unknown character being formed of lines and having a line pitch in the X direction and a line pitch in the Y direction, said method comprising the steps of:

obtaining a set of feature parameters from a two-dimensional pattern $f(X_i, Y_j)$ (i=1–M, j=1–N) which is obtained by sampling said unknown character at a sampling interval $\gamma$;

computing a local spatial density function $\rho(X_i, Y_j)$ from said two-dimensional pattern $f(X_i, Y_j)$, said spatial density function $\rho(X_i, Y_j)$ being obtained as a correlate of both the line pitch in the X direction and the line pitch in the Y direction;

computing an X-direction cumulative function $hx(X_i)$ by successively adding said spatial density function $\rho(X_i, Y_j)$ while $Y_j$ is varied from $Y_1$ to $Y_J$ and $X_i$ is fixed;

computing a Y-direction cumulative function $hy(Y_j)$ by successively adding said spatial density function $\rho(X_i, Y_j)$ while $X_i$ is varied from $X_1$ to $X_I$ and $Y_j$ is fixed;

extending said cumulative functions $hx(X_i)$ and $hy(Y_j)$ into continuous cumulative functions $hx(X)$ and $hy(Y)$, respectively;

matching coordinates of said set of feature parameters and coordinates of said spatial density function $\rho(X_i, Y_j)$; and determining new sampling points $(X_i, Y_j)$ of said set of feature parameters at new sampling intervals $(\delta i, \epsilon j)$ in the X and Y directions, the new sampling intervals satisfying the condition that the product of said cumulative function $hx(X_i)$ and $\delta i$ takes a first fixed value, and the product of said cumulative function $hy(Y_j)$ and $\epsilon j$ takes a second fixed value, wherein said correlate of both the line pitch in the X direction and the line pitch in the Y direction is a function of the product of the reciprocals of said line pitches in the X and Y directions.

17. A method for nonlinear normalization of an image as claimed in claim 16, further comprising the step of storing the unknown character in a buffer before the local spatial density function is obtained.

18. A method for nonlinear normalization of an image, which performs pre-processing for computing the correlation between an unknown character and a reference pattern, the unknown character being formed of lines and having a line pitch in the X direction and a line pitch in the Y direction, said method comprising the steps of:

obtaining a set of feature parameters from a two-dimensional pattern $f(X_i, Y_j)$ (i=1–M, j=1–N) which is obtained by sampling said unknown character at a sampling interval $\gamma$;

computing a local spatial density function $\rho(X_i, Y_j)$ from said two-dimensional pattern $f(X_i, Y_j)$, said spatial density function $\rho(X_i, Y_j)$ being obtained as a correlate of both the line pitch in the X direction and the line pitch in the Y direction;

computing an X-direction cumulative function $hx(X_i)$ by successively adding said spatial density function $\rho(X_i, Y_j)$ while $Y_j$ is varied from $Y_1$ to $Y_J$ and $X_i$ is fixed;

computing a Y-direction cumulative function $hy(Y_j)$ by successively adding said spatial density function $\rho(X_i, Y_j)$ while $X_i$ is varied from $X_1$ to $X_I$ and $Y_j$ is fixed;

extending said cumulative functions $hx(X_i)$ and $hy(Y_j)$ into continuous cumulative functions $hx(X)$ and $hy(Y)$, respectively;

matching coordinates of said set of feature parameters and coordinates of said spatial density function $\rho(X_i, Y_j)$; and determining new sampling points $(X_i, Y_j)$ of said set of feature parameters at new sampling intervals ($\delta i$, $\epsilon j$) in the X and Y directions, the new sampling intervals satisfying the condition that the product of said cumulative function $hx(X_i)$ and $\delta i$ takes a first fixed value, and the product of said cumulative function $hy(Y_j)$ and $\epsilon j$ takes a second fixed value, wherein said correlate of both the line pitch in the X direction and the line pitch in the Y direction is the sum of a term which includes the reciprocal of the line pitch in the X direction and a term which includes the reciprocal of the line pitch in the Y direction.

19. A method for nonlinear normalization of an image, which performs pre-processing for computing the correlation between an unknown character and a reference pattern, the unknown character being formed of lines and having a line pitch in the X direction and a line pitch in the Y direction, said method comprising the steps of:

obtaining a set of feature parameters from a two-dimensional pattern $f(X_i, Y_j)$ (i=1–M, j=1–N) which is obtained by sampling said unknown character at a sampling interval $\gamma$;

computing a local spatial density function $\rho(X_i, Y_j)$ from said two-dimensional pattern $f(X_i, Y_j)$, said spatial density function $\rho(X_i, Y_j)$ being obtained as a correlate of both the line pitch in the X direction and the line pitch in the Y direction;

computing an X-direction cumulative function $hx(X_i)$ by successively adding said spatial density function $\rho(X_i, Y_j)$ while $Y_j$ is varied from $Y_1$ to $Y_J$ and $X_i$ is fixed;

computing a Y-direction cumulative function $hy(Y_j)$ by successively adding said spatial density function $\rho(X_i, Y_j)$ while $X_i$ is varied from $X_1$ to $X_I$ and $Y_j$ is fixed;

extending said cumulative functions $hx(X_i)$ and $hy(Y_j)$ into continuous cumulative functions $hx(X)$ and $hy(Y)$, respectively;

matching coordinates of said set of feature parameters and coordinates of said spatial density function $\rho(X_i, Y_j)$; and determining new sampling points $(X_i, Y_j)$ of said set of feature parameters at new sampling intervals ($\delta i$, $\epsilon j$) in the X and Y directions, the new sampling intervals satisfying the condition that the product of said cumulative function $hx(X_i)$ and $\delta i$ takes a first fixed value, and the product of said cumulative function $hy(Y_j)$ and $\epsilon j$ takes a second fixed value, wherein said correlate of both the line pitch in the X direction and the line pitch in the Y direction is the reciprocal of the sum a term which includes the line pitch in the X direction and a term which includes the line pitch in the Y direction.

20. A method for nonlinear normalization of an image as claimed in claim 19, further comprising the step of storing the unknown character in a buffer before the local spatial density function is obtained.

* * * * *